US010943838B2

(12) United States Patent
Hoo et al.

(10) Patent No.: US 10,943,838 B2
(45) Date of Patent: Mar. 9, 2021

(54) MEASUREMENT OF OVERLAY ERROR USING DEVICE INSPECTION SYSTEM

(71) Applicant: KLA-TENCOR CORPORATION, Milpitas, CA (US)

(72) Inventors: Choon Hoong Hoo, Round Rock, TX (US); Fangren Ji, Austin, TX (US); Amnon Manassen, Haifa (IL); Liran Yerushalmi, Zicron Yaacob (IL); Antonio Mani, Leuven (BE); Allen Park, San Jose, CA (US); Stilian Pandev, Santa Clara, CA (US); Andrei Shchegrov, Los Gatos, CA (US); Jon Madsen, Los Altos, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 57 days.

(21) Appl. No.: 16/072,657

(22) PCT Filed: Jun. 24, 2018

(86) PCT No.: PCT/US2018/039192
§ 371 (c)(1),
(2) Date: Jul. 25, 2018

(87) PCT Pub. No.: WO2019/108260
PCT Pub. Date: Jun. 6, 2019

(65) Prior Publication Data
US 2019/0252270 A1 Aug. 15, 2019

Related U.S. Application Data

(60) Provisional application No. 62/626,850, filed on Feb. 6, 2018, provisional application No. 62/592,329, filed on Nov. 29, 2017.

(51) Int. Cl.
*H01L 21/00* (2006.01)
*H01L 21/66* (2006.01)
(Continued)

(52) U.S. Cl.
CPC .......... *H01L 22/12* (2013.01); *G03F 7/70616* (2013.01); *G03F 7/70633* (2013.01);
(Continued)

(58) Field of Classification Search
CPC . H01L 22/12; H01L 21/67253; H01L 23/544; G06F 30/39; G06F 7/70616; G06F 7/70633; G06T 7/001
See application file for complete search history.

(56) References Cited

U.S. PATENT DOCUMENTS 5,999,310 A 12/1999 Shafer et al.
6,295,384 B1 9/2001 Into
(Continued)

FOREIGN PATENT DOCUMENTS

WO 2015027198 A1 2/2015
WO 2017176915 A1 10/2017

OTHER PUBLICATIONS

ISA/KR, International Search Report and Written Opinion for PCT/US2018/039192 dated Oct. 26, 2018.

*Primary Examiner* — Richard A Booth
(74) *Attorney, Agent, or Firm* — Hodgson Russ LLP

(57) ABSTRACT

A method and system for measuring overlay in a semiconductor manufacturing process comprise capturing an image of a feature in an article at a predetermined manufacturing stage, deriving a quantity of an image parameter from the image and converting the quantity into an overlay measurement. The conversion is by reference to an image parameter quantity derived from a reference image of a feature at the same predetermined manufacturing stage with known over- (Continued)

lay ("OVL"). There is also disclosed a method of determining a device inspection recipe for use by an inspection tool comprising identifying device patterns as candidate device care areas that may be sensitive to OVL, deriving an OVL response for each identified pattern, correlating the OVL response with measured OVL, and selecting some or all of the device patterns as device care areas based on the correlation.

20 Claims, 19 Drawing Sheets

(51) Int. Cl.
*H01L 23/544* (2006.01)
*H01L 21/67* (2006.01)
*G06T 7/00* (2017.01)
*G03F 7/20* (2006.01)
*G06F 30/39* (2020.01)
*G06F 119/18* (2020.01)

(52) U.S. Cl.
CPC .............. *G06F 30/39* (2020.01); *G06T 7/001* (2013.01); *H01L 21/67253* (2013.01); *H01L 23/544* (2013.01); *G06F 2119/18* (2020.01); *G06T 2207/20216* (2013.01); *G06T 2207/30148* (2013.01); *H01L 2223/54426* (2013.01)

(56) References Cited

U.S. PATENT DOCUMENTS

| | | | |
|---|---|---|---|
| 7,345,825 B2 | 3/2008 | Chuang et al. | |
| 7,515,649 B2 | 4/2009 | Shim et al. | |
| 7,957,066 B2 | 6/2011 | Armstrong et al. | |
| 9,279,774 B2 | 3/2016 | Romanovsky et al. | |
| 2011/0170091 A1 | 7/2011 | Chang et al. | |
| 2015/0235108 A1 | 8/2015 | Pandev et al. | |
| 2015/0332451 A1* | 11/2015 | Amzaleg | G06T 7/001 382/149 |

* cited by examiner

Signal vs. intentional OVL

Signal vs. intentional OVL

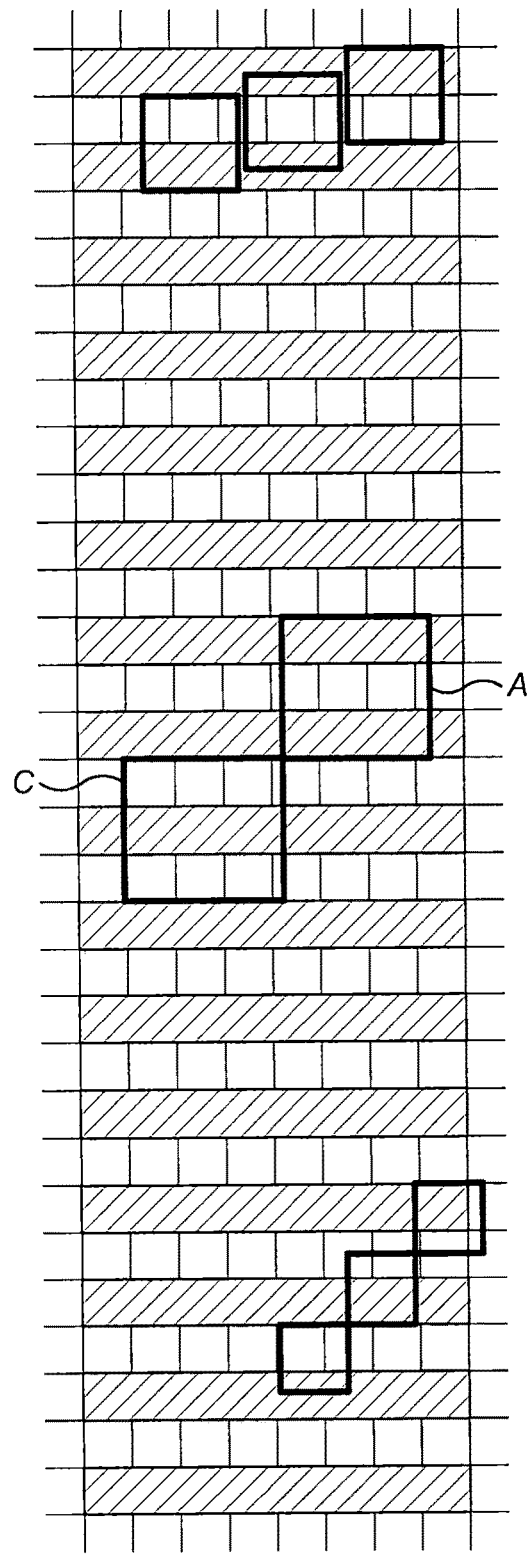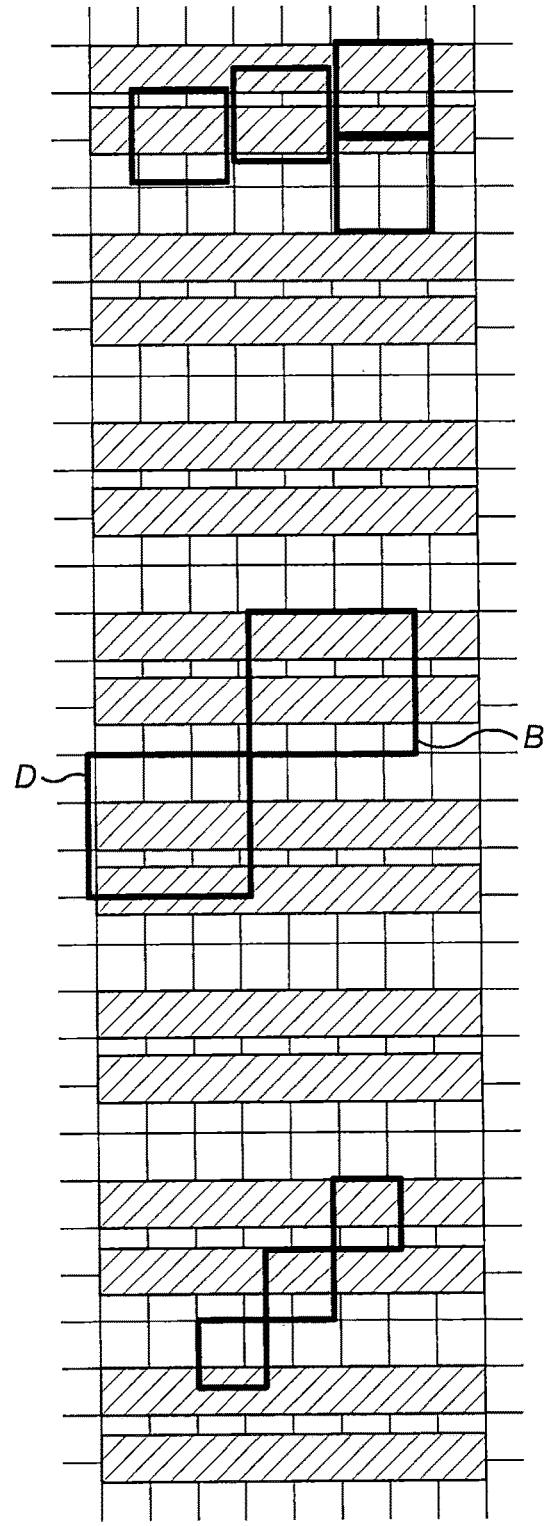
FIG. 8B                    FIG. 8C

MEASUREMENT OF OVERLAY ERROR USING DEVICE INSPECTION SYSTEM

This application claims the benefit of U.S. Provisional Patent Applications Nos. 62/592,329 filed 29 Nov. 2017 and 62/626,850 filed 6 Feb. 2018, which are incorporated herein by reference in their entirety.

The present invention relates generally to measuring errors in a layered manufacturing process for the manufacture of articles such as the manufacture of semiconductor wafers. Such errors may include errors critical dimensions, edge to edge placement and overlay for example.

FIELD OF THE INVENTION

Background of the Invention

In a layered manufacturing process such as the manufacture of semiconductor wafers, it is necessary for printed patterns in respective layers to be properly aligned when laid down in order for the manufacturing process and the eventual manufactured products to function correctly. As is well known in the art, the alignment may be assisted through the use of a dedicated metrology target, such as a diffraction grating printed on at least some of the layers, for example in an area separate from electronic devices being formed. For example, a semiconductor wafer may comprise an array of dies, each of which may include many electronic devices, separated by scribe lines which may define where the wafer is to be cut in a subsequent process. The metrology targets may be located in the scribe line areas, outside the dies. The term "overlay", abbreviated to "OVL" is used herein unless otherwise stated to refer to a measurement of the alignment of patterns in successive layers of an article, e.g. wafer. The greater the OVL, the greater is the misalignment. An OVL measurement other than zero is also referred to in the art as an "overlay error". Dedicated metrology tools, known as OVL tools or OVL systems, may be used to measure overlay error using metrology targets. The devices may be inspected at the end of a manufacturing process, and possibly during manufacture, by means of a separate inspection tool, or inspection system. An inspection tool or system may scan the entire wafer or jump to specific known "hotspots", for example areas or devices known to be prone to error.

Alignment requirements, also known in the art as edge placement requirements, are tightening as a result of shrinking design rules as components become ever smaller. This in turn tightens the specifications for OVL and Critical Dimension (CD). In order to achieve these requirements continuous improvements are being pursued in metrology tools and patterning control methods. Over the years Total Measurement Uncertainty (TMU) of OVL tools has shrunk considerably by improving Signal-to-Noise Ratio (SNR) and reducing optics asymmetry.

Having reduced the error of OVL target measurements, the next "bottleneck" in the error budget is Non-Zero Offset (NZO) that may result in a difference between OVL measured on a target after resist development (at after-development inspection "ADI") and OVL measured on the device after etch (at after-etch inspection "AEI"), where etching usually takes place after resist development. This is illustrated schematically in FIG. 1. NZO may be systematic and once identified efforts may be made to correct it. Currently, NZO is frequently detected using a scanning electron microscope "SEM".

While in metrology tools great care is taken to ensure good SNR so a quantity can be derived from the measurement of a resolved structure, such as a dedicated metrology target, in inspection tools, considerable effort is made to improve the detection capability of even the faintest signal, far below the resolution limit of the optics.

In semiconductor wafer manufacturing, the accurate determination of OVL is a goal in itself since measures known in the art may be taken to correct for OVL, and the more accurate the OVL measurement, the more effective are the correction measures.

SUMMARY OF THE INVENTION

Some embodiments of the invention generally relate to methods and systems and computer software for performing measurements which may be performed with an inspection tool or inspection system, and may take advantage of its sub-resolution capabilities for calibrating errors such as device specific NZO. Some embodiments of the invention have been devised for use in manufacturing semiconductor wafers but the same principles are applicable to other processes for manufacturing layered structures. Methods and systems according to some embodiments of the invention may reduce the need for use of an SEM to monitor and calibrate NZO, critical dimension "CD" and edge to edge "E2E" placement.

Some embodiments of the invention provide a method of measuring errors in a layered manufacturing process comprising capturing an image of a feature in an article at a predetermined manufacturing stage and deriving a quantity of an image parameter which varies in the captured image, for example gray level "GL", also referred to herein as intensity. The derived quantity may be converted into an error measurement, such as OVL, CD or E2E, by comparison with a reference quantity for said image parameter derived from a reference image of a feature at the same manufacturing stage. The size of the feature may be smaller than the resolution of the optical system used to capture the image. In other words, the details of the feature, may not be visible in the captured image.

The conversion may be performed in various ways. According to some embodiments of the invention, the quantity of the image parameter may be compared with the quantity of the same image parameter derived from an image of a feature at the same predetermined manufacturing stage where no OVL error is assumed to be present, or an OVL error of a known amount is present, to determine an image parameter difference. The parameter difference may be converted into OVL or other error. For example, a larger difference may imply a larger error. Some embodiments of the invention include compiling calibration data in order to convert the value of an image parameter, or parameter difference, into OVL or other error. The calibration data may be compiled using features in which OVL or other error of a known amount has been deliberately introduced.

The feature may be a metrology target or it may be a device, such as an electronic device in a manufactured wafer, or it may be a part of a target or a device. If the size of the feature is smaller than the resolution of the optical system, the actual pattern of a device may not be visible in a captured image for example. However, by analysis of an image parameter according to some embodiments of the invention, errors in the manufacture of the device may nevertheless be revealed. In other words some embodiments of the invention may take advantage of sub-resolution information in a captured image.

Some current metrology targets are themselves subject to NZO and therefore in some but not all embodiments of the invention it may be preferred for the feature captured in an image to be a device rather than a metrology target. Conversely, some embodiments of the invention may use metrology targets designed to take advantage of the sub-resolution capabilities of an image capturing device, described further herein. For example, a feature as referred to herein may comprise a cell or sub-cell in a metrology target.

The feature of which an image is captured and the feature from which the reference quantity is derived may be similar, for example corresponding features in different devices or targets or target cells. Conversely, for example where the feature is part of a target, the reference image may be derived from a different cell or sub-cell of the target designed to exhibit the same quantity of the image parameter, as will be described further herein.

The reference quantity may be obtained in various ways. For example, it may be part of or may be derived from a calibration data set. The calibration data set may simply include reference quantities, additionally or alternatively it may include reference images from which reference quantities may be derived. This may be useful if the reference quantity is to be determined "on the fly" e.g. for a part of the reference image rather than the whole of the reference image.

The reference image may be generated in various ways. For example, in the case of a manufacturing process, such as semiconductor wafer manufacturing, where several of the same feature, e.g. an integrated circuit or region thereof, may be produced in the same layer, the reference image may be an image of the same feature at another part of the same article. Therefore, according to some embodiments of the invention one or more new reference images may be generated for each article, or even each feature, under inspection.

It will be appreciated that the measurement of OVL or other error according to some embodiments of the invention may not be an absolute measurement. The reference image may be generated with the aim of being less susceptible to error than the article under investigation or the imaged feature. The resultant measurement may be a difference value derived from the comparison. Therefore, according to some embodiments of the invention an image may be compared to other images before selection as a reference image, for example to determine whether it is representative for that feature or whether it includes an aberration such as an OVL error.

Other ways of generating a reference image according to embodiments of the invention may include but are not limited to:
generating a reference image by averaging multiple images of the same feature at the same stage of manufacture, either on the same article or averaged over multiple articles; and
generating a reference image using computer modelling of the manufacturing process.

Any of several image parameters may be measured to derive a quantity and embodiments of the invention are not limited to the image parameter being GL. Other image parameters that may be quantified in an image for the purpose of OVL measurement may be used instead of GL according to some embodiments of the invention. For example, the image parameter may be any intensity value that may be derived from an image. Other image parameters that may be quantified for the purpose of some embodiments of the invention include but are not limited to parameters related to intensity such as intensity gradient or contrast. Image parameters that may be analyzed as a group for example over a cluster of pixels, for example to determine a mean or other statistic, may be used as an image parameter according to some embodiments of the invention.

Some embodiments of the invention provide a semiconductor wafer inspection system comprising a sensor to capture images of features of the wafer and a computing system comprising one or more processors configured to implement the steps of any of the methods described herein.

Some embodiments of the invention provide a semiconductor wafer including a metrology target, described further herein, which may be used for example in the selection of device patterns to be inspected according to methods according to other embodiments of the invention.

Some embodiments of the invention provide a method of selecting device patterns to be inspected by a device inspection tool for use in OVL measurement.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings:

FIGS. 8B and 8C are diagrams illustrating the relationship between pixel size and line/space size according to some embodiments of the invention;

DETAILED DESCRIPTION OF THE INVENTION

Figure 1:
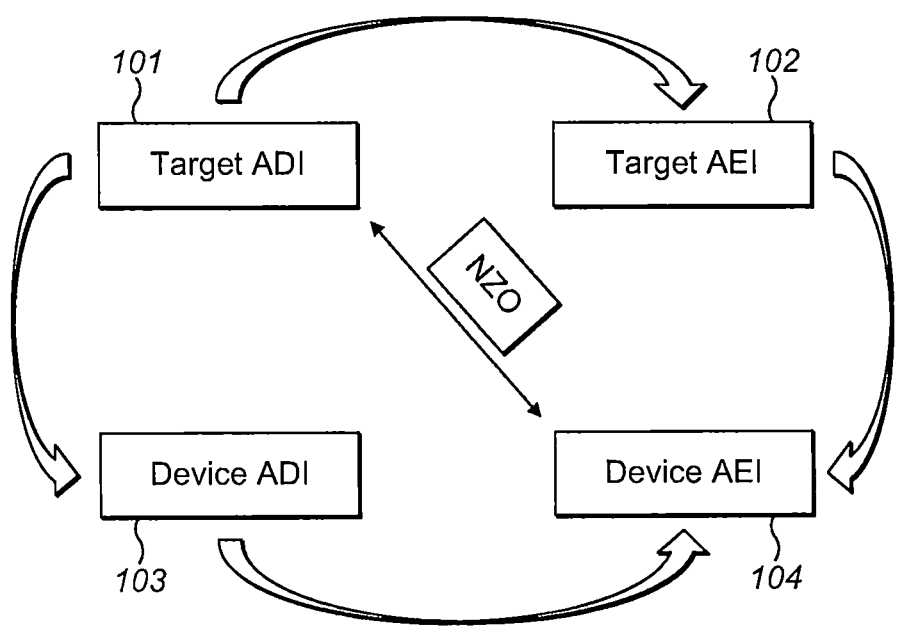
FIG. 1 shows schematically the relationship between target and device ADI and AEI according to some embodiments of the invention.

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

In the following, unless otherwise stated:

"target" refers to a dedicated target provided for the purpose of metrology, such a target may not have any purpose in a finished manufactured article and may be used only during the manufacturing process;

a "wafer" as described in relation to embodiments of the invention may be replaced by any other article that may be manufactured in a layered manufacturing process;

"device" refers to a device that is manufactured as part of the wafer manufacturing process, whether complete or partially formed, such as an integrated circuit "IC", of which billions may be formed in a single wafer, or a device within an IC such as but not limited to a diode, transistor, capacitor or resistor;

"OVL" refers to misalignment of a layer and is also referred to as "offset" or "OVL error", it may be measured as a difference from a reference value or as an absolute quantity;

the term "NZO" as used herein may refer to any systematic offset, for example an offset that is occurs with each repetitions of a process so that a correction will affect future repetitions of a process. NZO may drift over time and is not necessarily constant;

OVL is described as one example of the kinds of error that may be measured according to embodiments of the invention but the person skilled in the art will be able to use analogous methods to measure other errors such as CD or E2E placement errors.

FIG. 1 shows schematically the relationship between target and device ADI and AEI OVL measurements. The OVL measured on a target at ADI, indicated as "Target ADI" 101 in FIG. 1, may be different from the OVL measured on a target at AEI 102, both of which may be measured using a metrology tool. Device inspection, either ADI 103 or AEI 104, may reveal further OVL. Device inspection may be performed by an inspection tool. Inspection and metrology tools may differ in that whereas a metrology tool may be optimized for image resolution, an inspection tool may be optimized for signal detection. Thus, for example an inspection tool may reveal defects in a device being inspected from signal analysis which may not be visible in any images formed by the device. Furthermore, an inspection tool may have higher resolution imaging capability than a metrology tool. An NZO may be defined between any of 101, 102, 103 and 104. NZO is usually defined in the art as being between target ADI 101 and device AEI 104.

As noted elsewhere herein, efforts may be made to correct systematic errors once they have been identified. NZO can be device specific, for example different devices could have different OVL as a result of their unique structure and environment. Many parameters may contribute to NZO such as but not limited to pattern placement error (PPE), caused by pitch dependent pattern shifts due to scanner aberrations, etch bias for target and device, different process environments in die and on scribe line, and more.

Methods according to some embodiments of the invention may include capturing an image of a feature in a manufactured article. The image may be a low resolution image and need not show the feature itself in detail. The feature may be a metrology target or a device in a semiconductor wafer or a part of a target or device. By way of background, an SEM might be able to resolve features down to a single nm whereas the resolution of an optical inspection tool might be around 200 nm and the resolution of a metrology tool might be in the order of μm. Where the feature is a device or part of a device, this may be one that has been previously identified as being susceptible to OVL, for example as a result of machine learning. Examples of some such sensitive features are described with reference to FIG. 2.

Figure 2A:
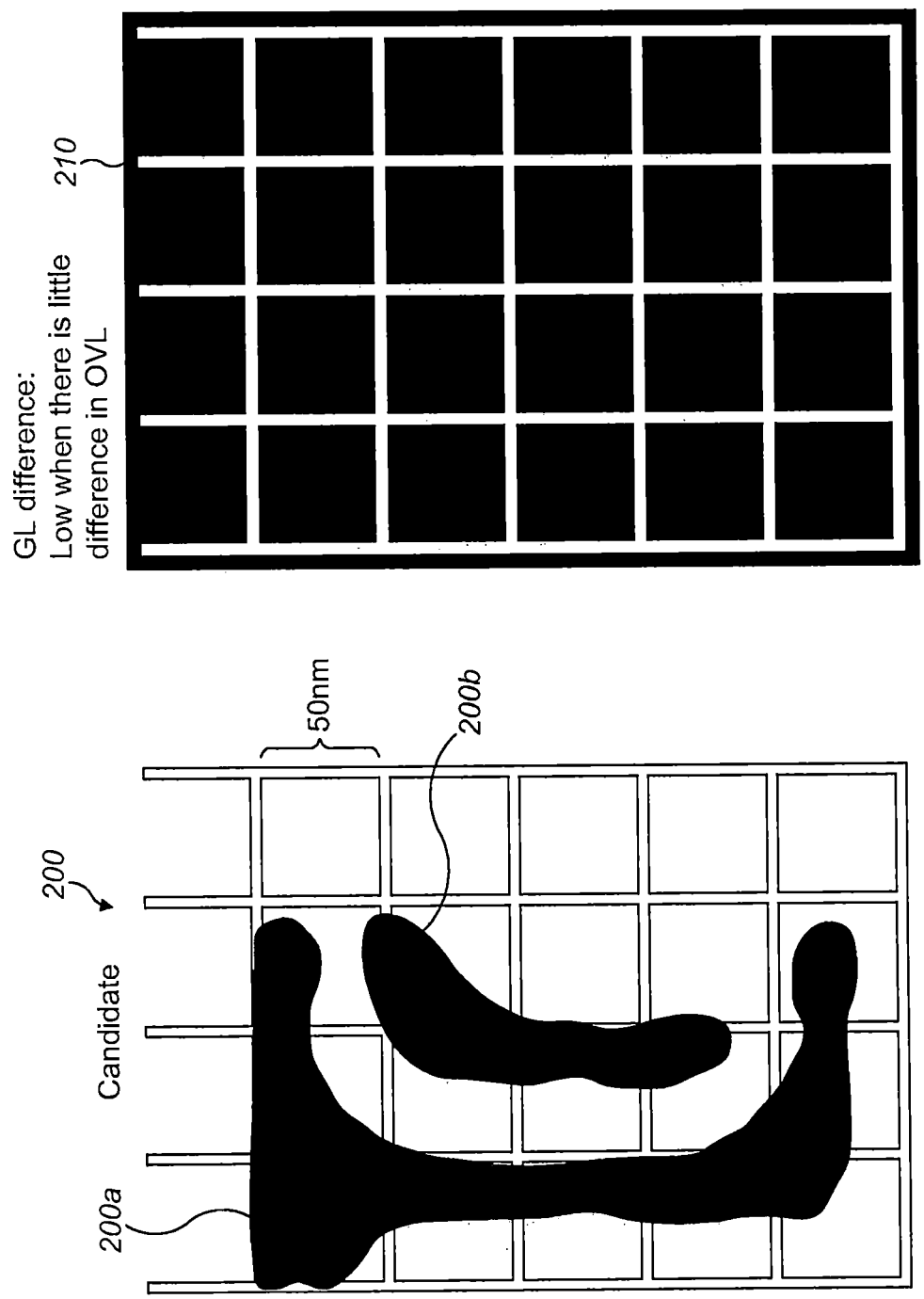
FIGS. 2A and 2B show examples of devices and image parameter difference according to some embodiments of the invention.

FIG. 2A shows on the left an example of a feature, namely a device in a manufactured semiconductor wafer. The device appears as two areas 200a, 200b. The grid shown in FIG. 2A shows the pixel size of an image that might be captured of the device. For the purpose of this explanation it is assumed that there are no OVL errors in the device 200. It can be seen in FIG. 2A that parts of the device are smaller than the pixel size.

Figure 2B:
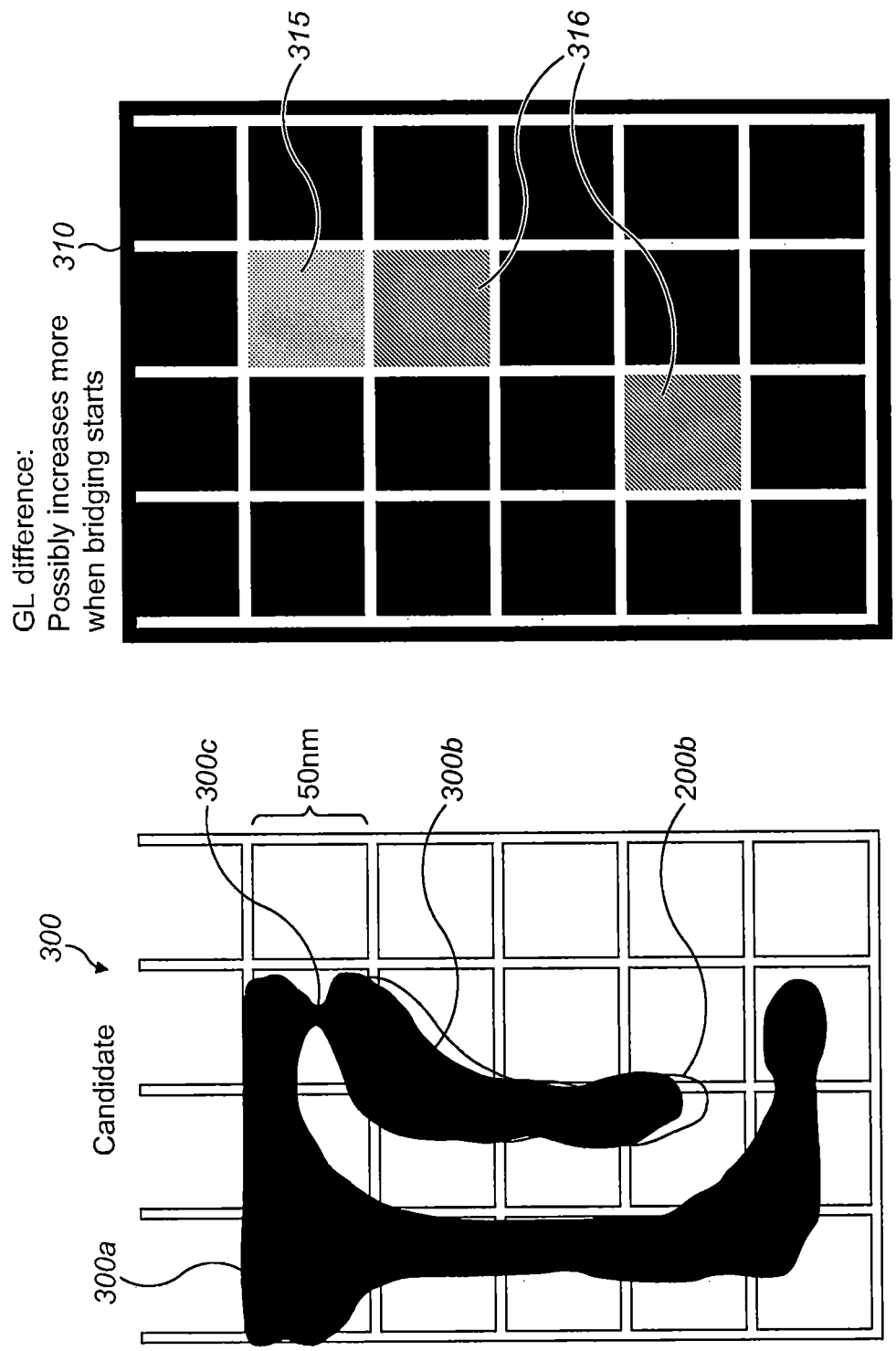

FIG. 2B shows on the left an example of a device 300 similar to the device 200 of FIG. 2A which has been manufactured with an OVL error. The device 300 includes two areas 300a and 300b, similar to areas 200a and 200b, but in this case a gap between the areas is bridged as indicated by 300c. This bridging may be caused by an OVL error. Also shown in FIG. 2B is the outline of area 200b to show that the entire area has shifted as compared to FIG. 2A. Bridging and other defects in a manufactured semiconductor wafer device may only be visible in a high resolution imager such as a "SEM". Methods and systems according to some embodiments of the present invention may enable such errors to be detected and possibly also quantified without the need for such high resolution imaging.

A method according to some embodiments of the invention may include deriving a quantity of an image parameter, such as GL, from a captured image of a manufactured article, such as a captured image of device 300. The quantity may be converted into an OVL measurement by reference to a quantity for said image parameter derived from a reference image of a feature at said predetermined manufacturing stage. The reference image may have known OVL or the reference image may be assumed to have an OVL error of a particular amount. For example, the reference image may be generated by averaging images of the same feature in other parts of the same wafer or on multiple wafers. As such the reference image may be assumed to have zero or a particular amount of OVL error.

The derived quantity such as GL in a captured image may be compared with the quantity derived from an image of an article where it is assumed that no OVL or an assumed OVL amount is present, such as a captured image of device 200, to determine a difference which may be converted into an OVL measurement. The difference may be determined from a difference image. Two examples of difference images are shown in FIGS. 2A and 2B.

FIG. 2A shows on the right a GL difference image 210 determined by comparing an image of the device 200 with an image of a device assumed to have no OVL errors. Here, black represents no difference. Since there are no OVL errors in device 200, the difference image is entirely black.

FIG. 2B shows on the right a GL difference image 310 determined by comparing an image of the device 300 with an image of device 200. Here GL difference appears in pixel 315 corresponding to area 300c and in pixels 316 where the shifting of area 300b is most pronounced. A measure of GL difference between images, or image captures, may be converted into a measurement of OVL.

A measure of GL difference between two images may be determined in various ways and embodiments of the invention may use any suitable method known in the art of image processing, including but not limited to any statistical method such as mean, average or medium, and any known technique for determining image contrast. According to some embodiments of the invention a GL difference may be determined from one or more pixel clusters in the image rather than a complete pixel array in an image capturing device.

It will be appreciated from the grids shown in FIGS. 2A and 2B that the precise details of the device are not visible in the images. Thus, embodiments of the invention may use the sub-resolution properties of an image capturing device in an inspection tool to calibrate and/or correct OVL such as device-specific NZO and reduce the requirement for an SEM to monitor and/or calibrate NZO.

The conversion of an image parameter into OVL may be achieved in various ways and is not limited to image comparison as described with reference to FIGS. 2A and 2B. According to some embodiments of the invention calibration data, such as a calibration matrix or look-up table, may be provided for the conversion. Calibration data may describe a relationship between the quantity of the image parameter and OVL. Using such data, it may not be necessary to compare each measured signal with a corresponding "no OVL" or "assumed OVL" signal to obtain an OVL measurement such as a difference value. A suitable data set may correlate measured signal directly with an OVL measurement. Some embodiments of the invention may comprise the generation of calibration data. According to some embodiments of the invention, for example in the case of a new feature, a method according to the invention may require image comparison in order to determine OVL. In other cases, for example using calibration data or machine learning as discussed further herein, image comparison may not be needed.

A calibration matrix, or dataset, for converting a measured signal representing an image parameter, such as GL, into OVL may be generated by deliberately introducing OVL in varying amounts to determine a relationship between OVL and the image parameter. This introduced OVL is referred to herein as "intentional OVL", also known in the art as "offset". Depending on how the OVL is measured, the calibration matrix itself may suffer from OVL so that it is not optimal. Such "calibration" OVL may be identified through the use of an SEM for example. If that is the case it is possible to "clean" a calibration matrix by shifting the data so that the signal is at a minimum where the intentional OVL is zero. In other words, a calibration matrix may be optimized to result in a symmetrical signal versus intentional OVL. This is illustrated in FIGS. 3A and 3B.

Figure 3A:
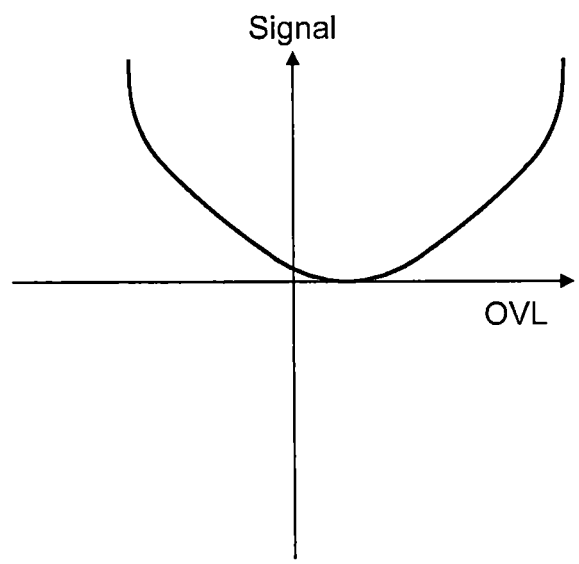
FIGS. 3A and 3B show signal versus OVL calibration graphs, before and after correction for inherent NZO according to some embodiments of the invention.
Figure 3B:
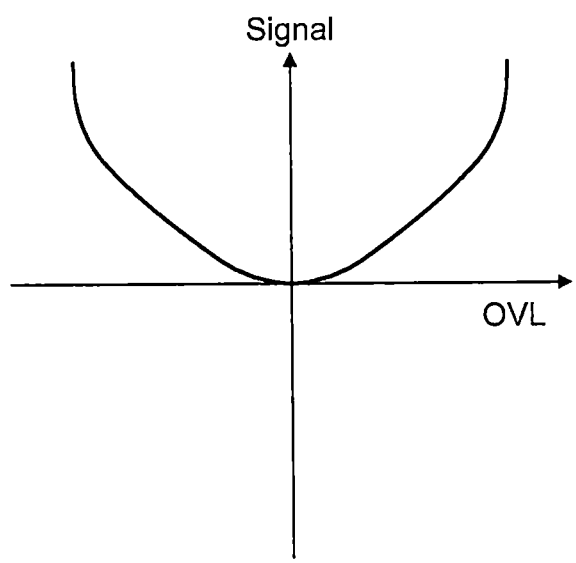

FIG. 3A shows a possible relationship between intentional OVL and a measured signal, such as magnitude of GL difference (which may be positive or negative), where the minimum signal is at a positive value of OVL. FIG. 3B shows the same relationship where the signal values are "cleaned" or shifted along the OVL axis so that the minimum signal corresponds to zero OVL. This can also be done if the calibration signal is not symmetric but known. For example, it may be that due to other factors, such as a global CD change, or global film thickness change, that all OVL measurements were skewed by the same amount. If the mechanism is known, then it can be used to calibrate the graph. For example, a global CD change may have caused the OVL response curve to move to the right, when there is actually no global OVL issue. If the amount by which the CD is affecting the OVL response is known, it can be corrected by shifting all OVL measurements by a certain amount so that once again the minimum of OVL-signal once again corresponds with 0-OVL.

According to some embodiments of the invention, machine learning may be used in the conversion of image parameter quantity into OVL in any manner known to those skilled in the art of machine learning. For example, a data set used for conversion of a quantity into OVL may be updated or improved, based on experience. The success or failure of attempts to correct OVL in response to measured OVL may inform a machine learning process, and so may measurements of OVL from a more accurate source such as CD-SEM information. Such a SEM based ML can be generalized to include both OVL and CD. However, it will be appreciated that methods according to some embodiments of the invention may obviate or at least reduce the need for the use of SEM for the use of NZO monitoring. Furthermore, through the use of targets described elsewhere herein designed for use in some embodiments of the invention, the need for SEM to perform calibration and NZO correction may also be reduced or obviated.

OVL measurement according to some embodiments of the present invention may be performed at various stages of a manufacturing process including but not limited to some or all of the stages mentioned in connection with FIG. 1. Different calibration data may be used at each measurement stage. OVL measured at different stages may be due to different factors. For example, OVL measured at ADI may be due to PPE, which may then be corrected. OVL measured at AEI may enable measurement of OVL due to etch bias, which may then be corrected.

OVL measurement according to some embodiments of the invention, based on image capture of a device rather than a metrology target, may reveal OVL that is either not detected or incorrectly measured using currently known dedicated metrology targets. Some embodiments of the invention may enable the compilation of data on OVL measured from a target versus OVL measured by device inspection. For example, it is possible to compile data on target versus device OVL measured at ADI and/or target versus device OVL measured at AEI. Either of these may enable process control flags to be provided during a lithography/consequent process steps to warn of an expected NZO problem. More generally OVL measurement of device specific structures in AEI can serve as an alert for a process issue.

Figure 4A:
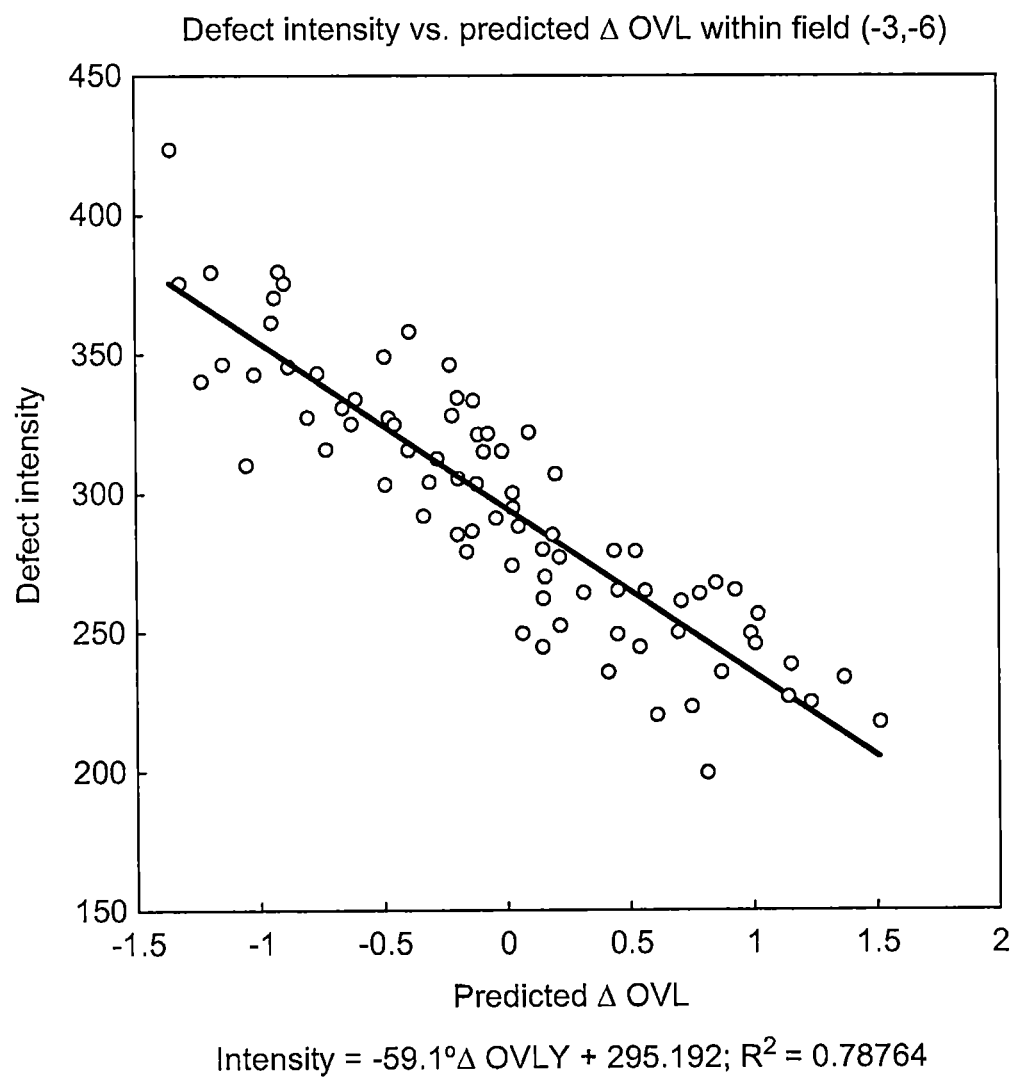
FIGS. 4A, 4B and 4C show three graphs illustrating respectively the correlation between GL difference, or intensity, and OVL, CD and edge to edge "E2E" obtained according to some embodiments of the invention.
Figure 4B:
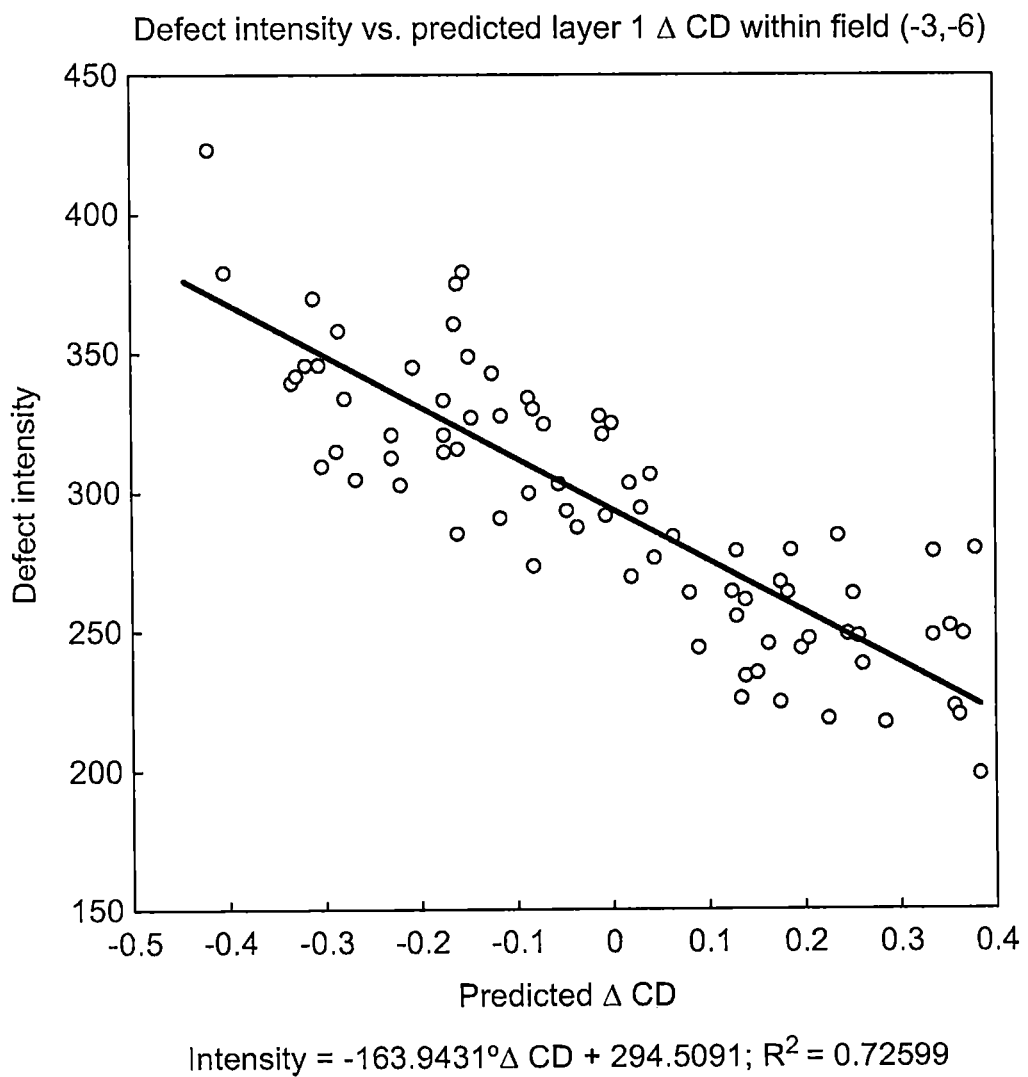
Figure 4C:
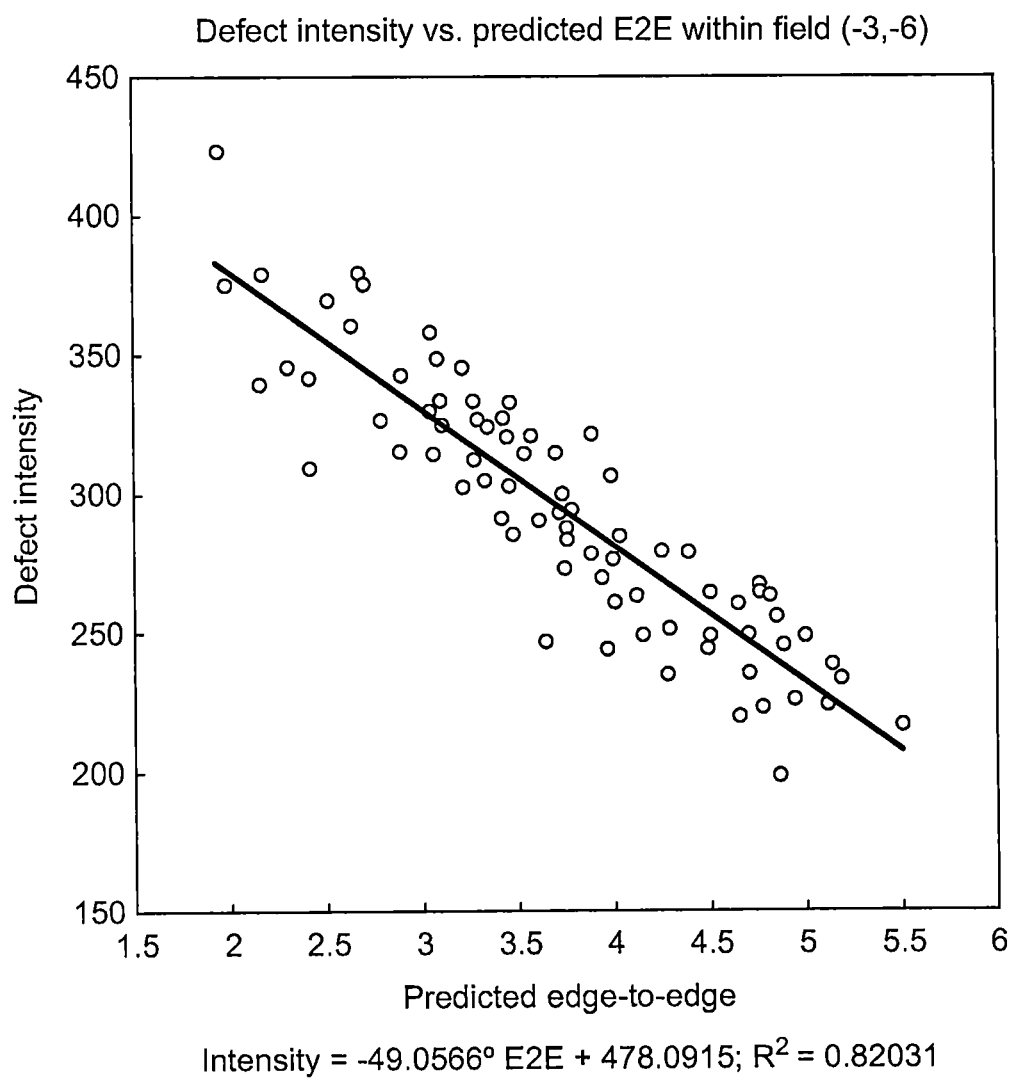

FIGS. 4A, 4B and 4C show three graphs illustrating respectively the correlation between GL difference, or intensity, and OVL, CD and E2E which is a combination of CD and OVL. From the graphs it can be seen that GL difference is a good indicator of OVL.

Methods according to some embodiments of the invention may be performed using an inspection tool or inspection system and may obviate the need for metrology using currently available metrology targets, as well as reducing the need for measurement using a scanning electron microscope "SEM" which is relatively expensive in terms of time and equipment.

According to some embodiments of the invention, OVL may be measured using an inspection tool while it is inspecting a wafer for other defects.

Figure 5:
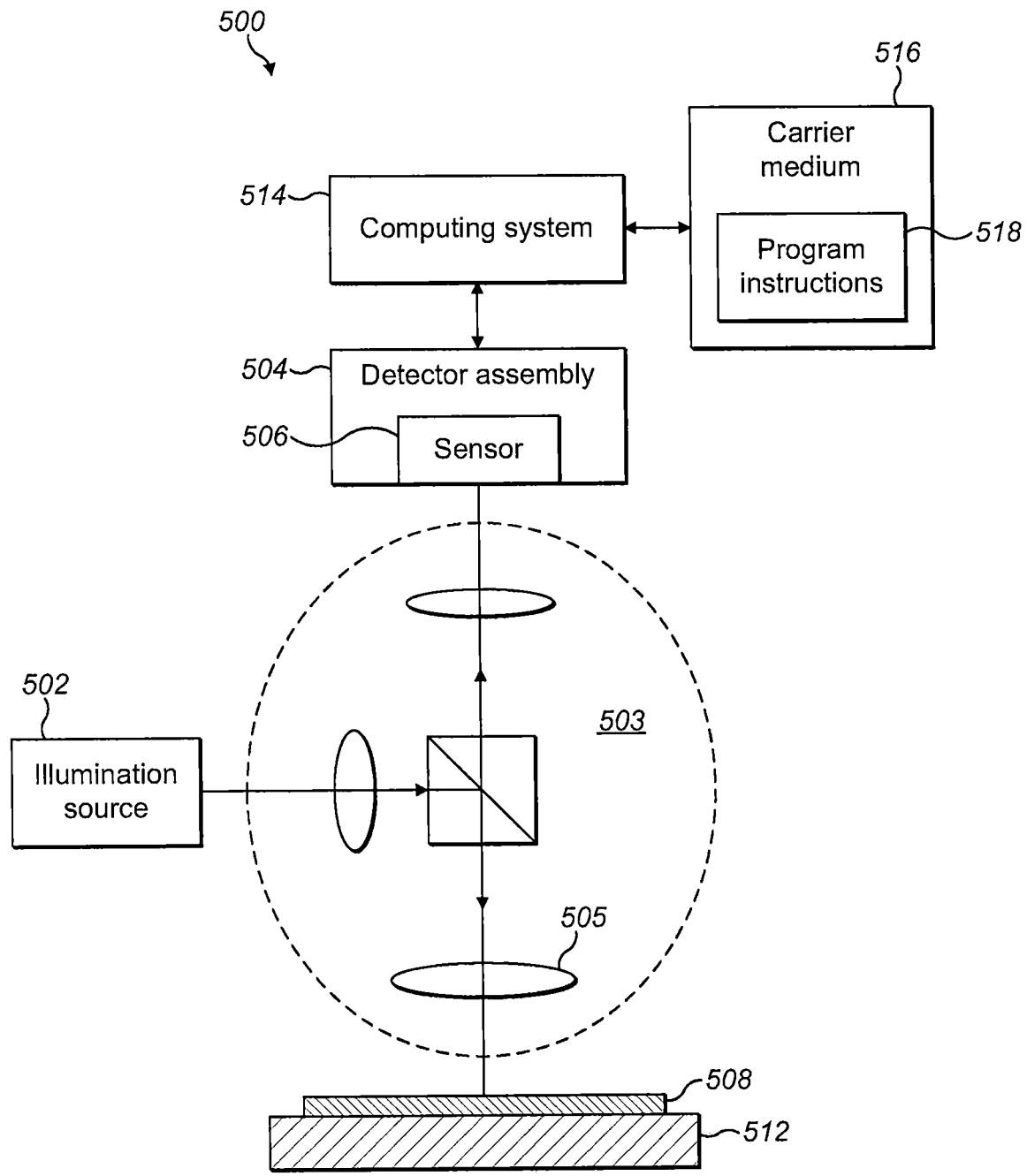
FIG. 5 is a schematic illustration of a device inspection system according to some embodiments of the invention.

Methods according to some embodiments of the invention may be performed using an inspection system of a kind known in the art, also generally referred to as a "tool". Metrology and inspection tools may both be generally referred to as "imaging tools". One such system is shown in FIG. 5 and is described in further detail in international patent application WO2017176915 entitled "Dual-Column-Parallel CCD Sensor and Inspection Systems Using Sensor". The system of FIG. 5 is an example of many kinds of system or tool that may be used to perform some methods according to the invention. Some embodiments of the invention may be performed using any tool that has the capability to form a GL image and perform image comparison to determine GL difference. Other embodiments may use calibration data such that image comparison is not necessary. Systems according to some embodiments of the invention may form other kinds of image from which a different image parameter quantity may be derived.

FIG. 5 illustrates schematically an exemplary inspection tool configured to inspect a sample 508, such as a wafer, reticle, or photomask. The tool illustrated in FIG. 5 may be part of a broadband plasma (BBP) defect inspection system available from KLA-Tencor Corporation. Such a tool is not usually used for the measurement of OVL. In the tool of FIG. 5, sample 508 is placed on a stage 512 to facilitate movement to different regions of sample 508 underneath the optics 503. Stage 512 may comprise an X-Y stage or an R-θ stage. In some embodiments, stage 512 can adjust the height of sample 508 during inspection to maintain focus. In other embodiments, an objective lens 505 can be adjusted to maintain focus.

An illumination source 502 may comprise one or more lasers and/or a broad-band light source. Illumination source 502 may emit deep ultraviolet DUV and/or vacuum ultraviolet "VUV" radiation. Embodiments of the invention are not limited in terms of the kind of radiation used to capture an image. Optics 503, including an objective lens 505, directs radiation from illumination source 502 towards and focuses it on sample 508. Optics 503 may also comprise mirrors, lenses, polarizers and/or beam splitters (not shown for simplicity). Light reflected or scattered from sample 508 is collected, directed, and focused by optics 503 onto a sensor 506, which is within a detector assembly 504.

Detector assembly 504 includes one or more sensors for capturing an image of a feature on the sample. The sensor may comprise a pixelated image capturing array. In one embodiment, the output of sensor 506 is provided to a computing system 514, which analyzes the output. Computing system 514 may be configured by program instructions 518 to implement a method according to some embodiments of the invention. The program instructions can be stored on a carrier medium 516. In one embodiment computing system 514 may control the inspection system 500 and sensor 506 to inspect a structure on sample 508 and read out the sensor 506 in accordance with any of the methods disclosed herein. The carrier medium 516 may store calibration data for use in converting a derived quantity of an image parameter into an OVL value.

In one embodiment, illumination source 502 may be a continuous source of radiation, such as an arc lamp, a laser-pumped plasma light source, or a continuous wave "CW" laser. In another embodiment, illumination source 502 may be a pulsed source, such as a mode-locked laser, a Q-switched laser, or a plasma light source pumped by a Q-switched laser. In one embodiment of inspection system incorporating a Q-switched laser, the sensor or sensors within detector assembly 504 are synchronized with the laser pulses.

One embodiment of inspection system illuminates a line on sample 508, and collects scattered and/or reflected light in one or more dark-field and/or bright-field collection channels. In this embodiment, detector assembly 504 may include a line sensor or an electron-bombarded line sensor. Another embodiment of inspection system illuminates an area on sample 508, and collects scattered and/or reflected light in one or more dark-field and/or bright-field collection channels. In this embodiment, detector assembly 504 may include an array sensor or an electron-bombarded array sensor.

The components of the system shown in FIG. 5 may be provided as a piece of standalone equipment and are hence also referred to as an inspection tool. However, it will be appreciated that this is not essential, for example the computing system and carrier medium could be separate from the optical and other components, even in a remote location, hence the use herein of the more general term "system".

Other inspection systems suitable for performing methods according to some embodiments of this invention are described in U.S. Pat. No. 9,279,774 entitled "Wafer inspection system", U.S. Pat. No. 7,957,066 entitled "Split field inspection system using small catadioptric objectives", U.S. Pat. No. 7,345,825 entitled "Beam delivery system for laser dark-field illumination in a catadioptric optical system, U.S. Pat. No. 5,999,310 entitled "Ultra-broadband UV microscope imaging system with wide range zoom capability", U.S. Pat. No. 7,515,649 entitled "Surface inspection system using laser line illumination with two dimensional imaging".

Figure 6:
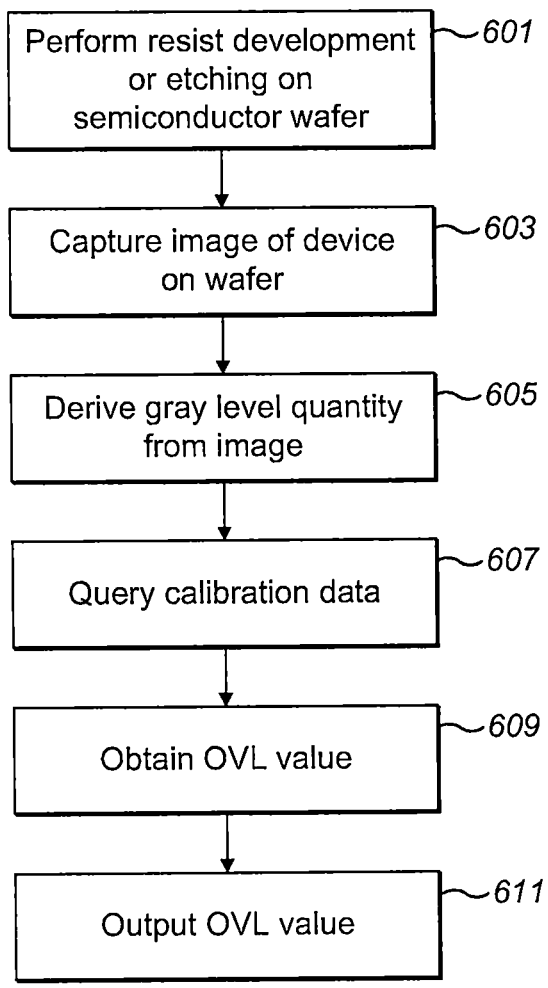
FIG. 6 is a flow chart illustrating a method according to some embodiments of the invention.

A method of measuring OVL according to some embodiments of the invention will now be described with reference to FIG. 6. The method may take place at a particular stage in a manufacturing process, for example after etching or after resist development. Therefore, the method of FIG. 6 begins with operation 601, performing resist development or etching on a semiconductor wafer. Embodiments of the invention may not be limited to wafer manufacturing and may commence with operations other than operation 601.

At operation 603, after resist development or etching, an image of a feature on the wafer is captured, for example using a sensor such as sensor 506, wherein the image shows variations of an image parameter, in this embodiment GL. In known manufacturing processes after lithography or resist development it is usual to capture images of targets, whereas images of devices may be captured after etching at which point lithography targets may have been etched away. Embodiments of the invention need not be subject to these limitations. In FIG. 6 it is assumed that the feature of which an image is captured in step 603 is a device. However, the operations 603-611 of FIG. 6 may apply equally to a metrology target, either of a known kind or a novel metrology target as described further herein. A GL quantity or other image parameter quantity may then be derived from the image at operation 605. The GL derivation may be performed in computing system 514, using an image analysis process of any kind known in the art. The derived quantity may then be converted into OVL. As shown in FIG. 6 this may be achieved by querying calibration data at operation 607. The calibration data may be derived in a method described with reference to FIG. 11 for example. For example, a processor in computing system 514 may send a query to a data store at carrier medium 516 to receive or obtain an OVL value at operation 609. The value may be output, for example via a user interface at computing system 514.

In some embodiments, a known system may be enabled to operate according to the invention through different software, implemented for example in a processor in computing system 514, using a currently available inspection system. Thus, some embodiments of the invention provide a computer readable medium, transitory or non-transitory, comprising instructions which when implemented in a processor of a semiconductor metrology system cause the system to operate according to any of the methods described herein.

According to some embodiments of the invention, a dedicated metrology target may be used for measuring OVL from a detected image parameter. This will be described further by reference to FIGS. 7 to 11.

Figure 7:
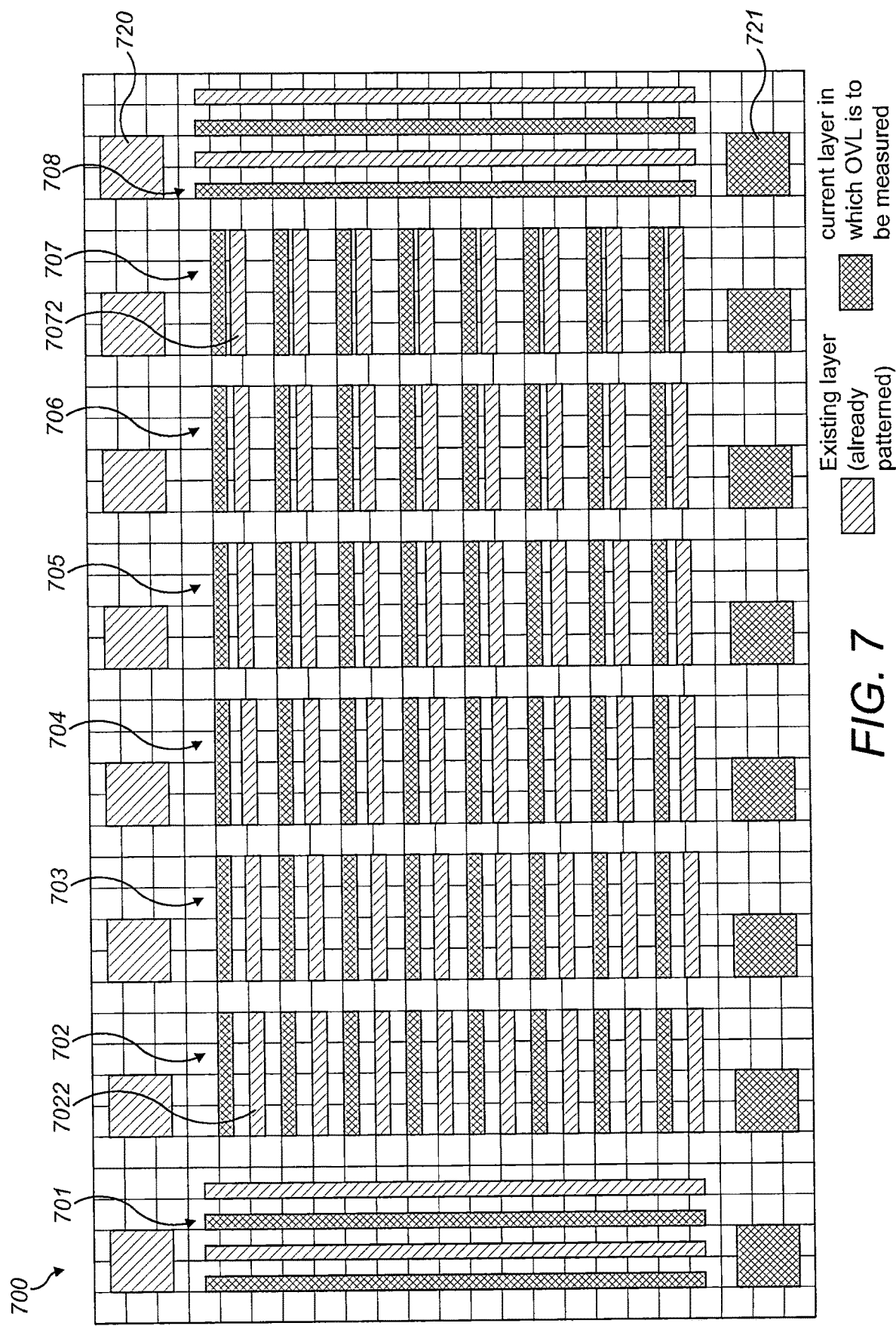
FIG. 7 is a schematic diagram of a metrology target that may be used in systems and processes according to some embodiments of the invention.
Figure 10:
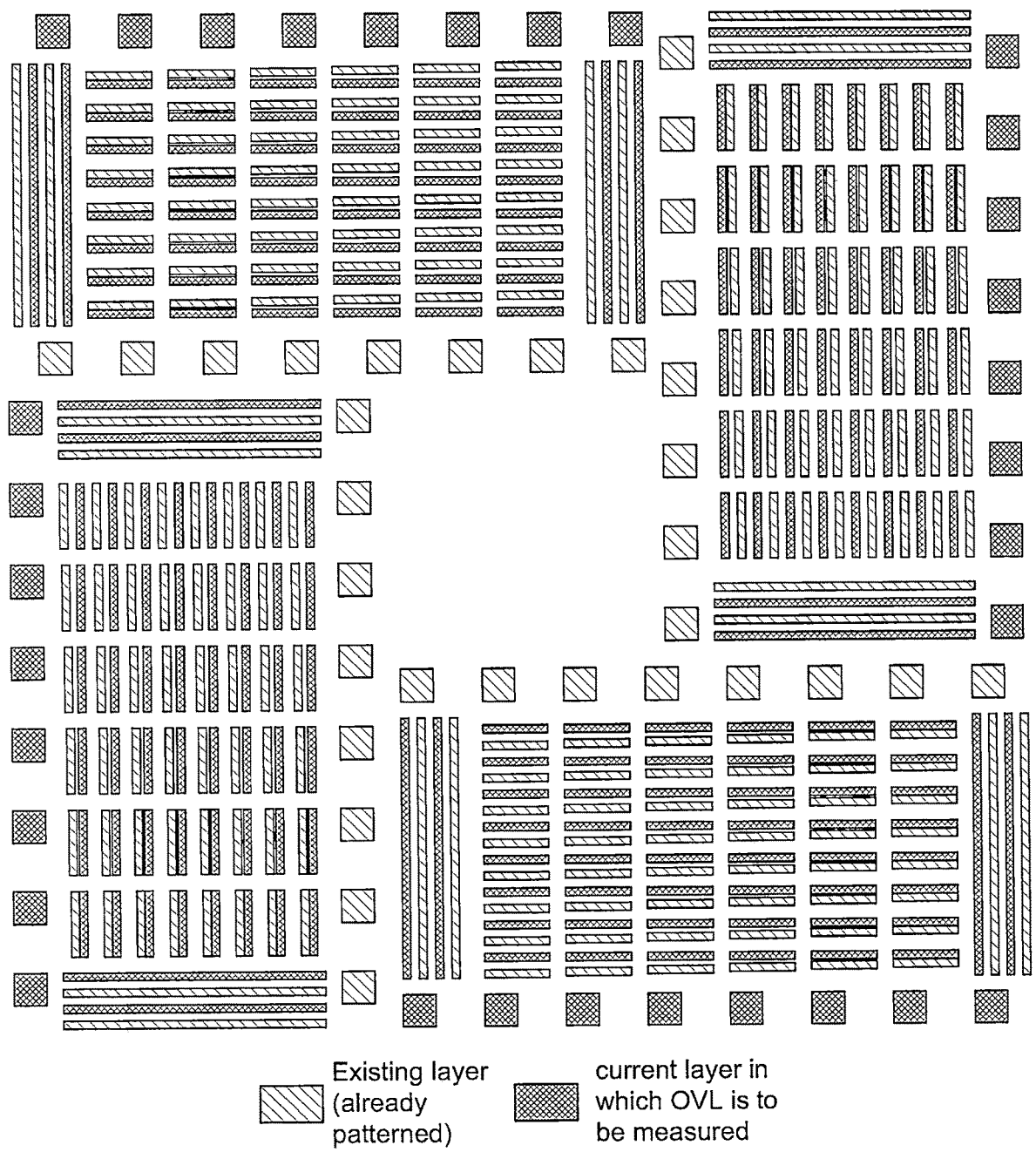
FIG. 10 is a schematic diagram of a metrology target including multiple targets of the kind shown in FIGS. 7-9.

FIG. 7 is a schematic diagram of a metrology target 700 that may be used in systems and processes according to some embodiments of the invention for measuring OVL in one dimension. Thus, some embodiments of the invention provide a semiconductor including a metrology target as described further herein. As is known in the art, a metrology target may comprise at least two cells, one for measuring OVL in one dimension and one for measuring OVL in a perpendicular dimension. A typical metrology target may comprise two or more cells for each of two orthogonal dimensions. Thus a metrology target as shown in FIG. 7 may comprise one cell of a larger target. An example of a larger target is shown in FIG. 10 comprising four targets, or cells, of the kind shown in FIG. 7, arranged with two cells orthogonal to two other cells.

The target 700 as shown in FIG. 7 may be formed in two layers of a manufactured article, but it will be appreciated that the principle of operation of the target may be extended to larger numbers of layers. The solid and shaded regions in FIG. 7 represent target lines or areas in different layers of the wafer. The target may be designed for ADI and thus the upper layer as shown in FIG. 7 may be a resist layer which will later be etched, possibly removing the target in the resist layer. The significance of this is that adjustments in the formation of targets or devices may be performed at this stage as is known in the art. After etching the possibility for adjustment is limited if not impossible. The target comprises a set of spaced lines, some perpendicular to others. The target is shown on a square grid for the purpose of illustrating a possible pixel size of an image capturing device that may be used in a system according to some embodiments of the invention. The target may be smaller than known metrology targets and its size, e.g. area or dimensions, may be of the same order of magnitude as the size of a device, e.g. a device in a semiconductor wafer. According to some embodiments of the invention, the line width or the width of spaces between lines may be between 10-50 nm.

All of the lines of the target 700 that are in the same layer may exhibit the same GL. The target 700 is shown as comprising eight vertical columns 701-708. The columns may have any generally rectangular shape or orientation and it is not essential for them to be columnar. Where target 700 is one cell of a larger target, the columns may be regarded as sub cells of the target. As illustrated, two columns 701 and 708 comprise parallel lines and the remaining columns 702-707 comprise parallel lines which are perpendicular to the lines of columns 701 and 708. These are referred to in the following as horizontal and vertical in the following for convenience but it will be appreciated that the orientation is immaterial. More generally a target may include at least one column or sub-cell comprising parallel lines in one direction, such as 701, 708 and two or more columns or sub-cells comprising columns in the perpendicular direction, such as 702-707. Each column may include lines formed in at least two layers of the article. A small number of lines and columns is shown in FIG. 7 for the sake of clarity but it will be appreciated that in practice a target may comprise a larger number of both.

The columns 701 and 708 are identical in terms of number of lines and spacing. At least one of the columns 702-707 may be designed to exhibit the same quantity of an image parameter, in this example GL, as one of the columns 701, 708 comprising perpendicular lines, at least over part of the area of the column, for example by applying the same total line to space ratio evenly over the column or column area as shown by comparing columns 701 and 702 where the line spacing is periodical and in phase between one layer and the other. In the example of FIG. 7, the ratio of line to space area is 50%. The lines are shown to be aligned with the pixels for ease of understanding but it will be appreciated that even if this alignment is not present, the average GL over a suitably large cluster of pixels will be the same in columns 701 and 702.

Columns 702-707 have the same number of lines in each layer but at least some of the lines in different columns are offset with respect to each other by a predetermined amount. In other words, the position of at least some of the lines in one column is shifted as compared with the corresponding line in another similar column, in a direction perpendicular to the line direction. Thus for example, if column 703 is compared with column 702, a slight vertical shift is noticeable in alternate lines. As shown the shifted lines are from the same layer and the lines in the other layer are aligned in adjacent columns. However, this is not essential. Each of columns 702-707 has at least some lines shifted with respect to corresponding lines in another column. In the example of FIG. 7 the same line of each next column from left to right is shifted by the same amount so that the shift is most noticeable by comparing line 7072 of leftmost column 707 to line 7022 of rightmost column 702 where the shift is equal, e.g. to half a pixel depth. These deliberate offsets are equivalent to a predetermined, e.g. 1 nm, OVL between one column and its neighboring column. The offset may be calibrated or verified using a SEM. In general, the offset may be up to 10 nm, for example 1-10 nm or even less than 1 nm as device and target sizes continue to decrease.

According to some embodiments of the invention a target may include resolvable features as well as features such as the lines that are too small to be resolved by an inspection tool. These may be formed in each layer. FIG. 7 shows resolvable features in the form of squares, in this example indicated to be 100 nm wide, one 720 is indicated in the existing layer and one 721 is indicated in the current layer. One resolvable target may be provided for each column, for example aligned with a respective column.

Figure 8A:
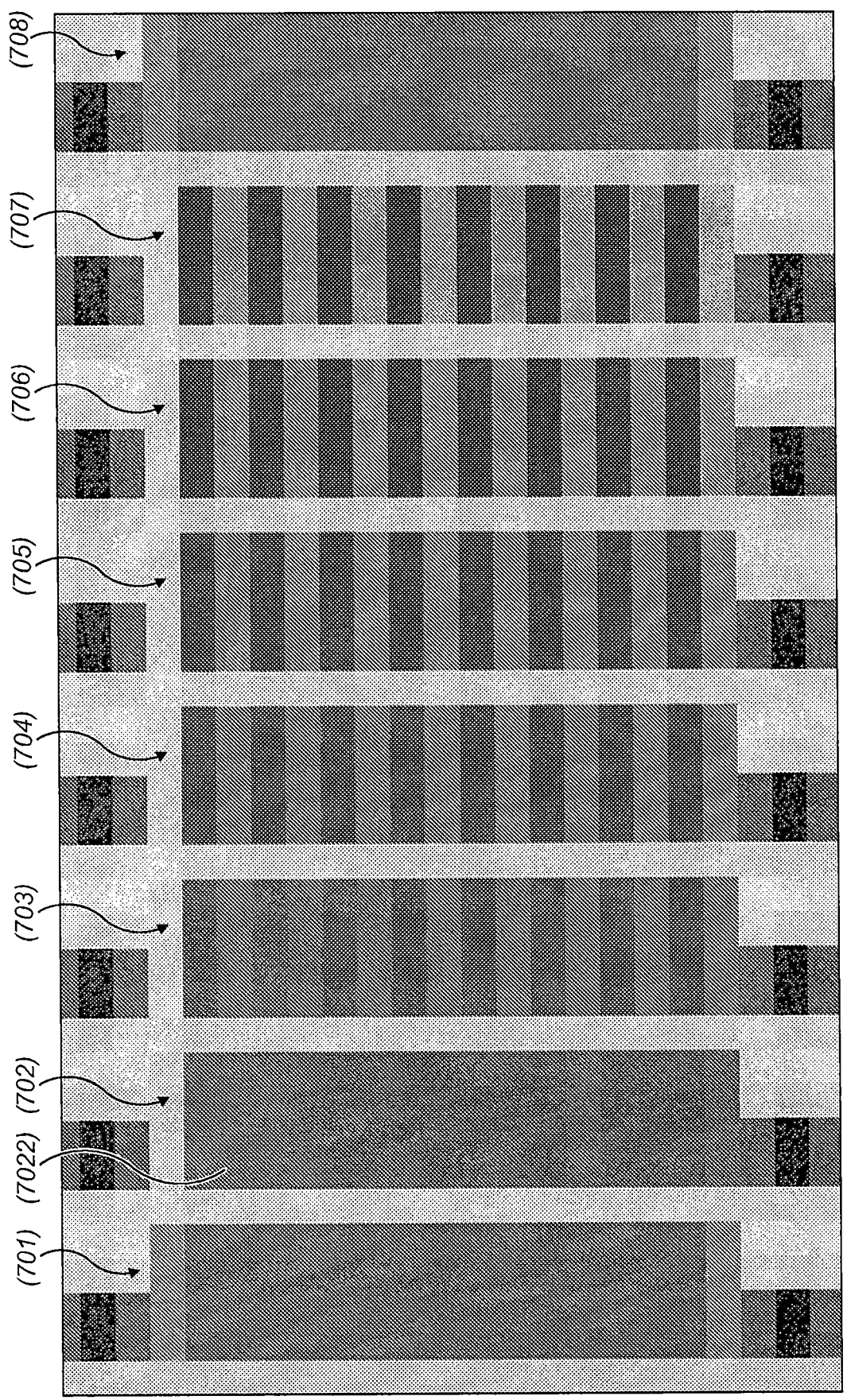
FIG. 8A shows a grayscale image of the metrology target shown in FIG. 7.

FIG. 8A illustrates a grayscale image of target 700. Corresponding parts of target 700 are indicated on FIG. 7 in brackets. Here it can be seen that the GL of the pixel row containing line 7022 goes from a high level in column 702 to 50% lower in column 707. Also line 7022 is confined to one pixel row whereas line 7072 is captured by two rows of pixels. Thus although line 7072 cannot be resolved, the fact that it has shifted is evident from the change in GL. According to some embodiments of the invention, the resolution of the image capturing device, or image pixel size, may be up to 5 times the width of a target line or space, or in the case of an overall periodic line/space arrangement the pixel size may be up to twice the pitch, or twice the sum of the line and space width. The figures show arrangements in which the pixel size is equal to the pitch, so if line/space=20 nm each, then pixel size is 40 nm, or if line/space is 18/22, then pixel size is still 40 nm. More generally the pixel size in the captured image may be an integral multiple of the pitch.

FIGS. 8B and 8C explain the relationship between pixel size and line/space size. FIG. 8B shows an image of a target in which the pixel size is equal to the width of a line in a target and the line and space width are equal. In FIG. 8C alternate lines are shifted towards an adjacent line such as might occur if alternate lines were in different layers. In other words, in FIG. 8B the width of a line or a space is defined as half-pitch.

A suitable pixel size is exactly 1-pitch or 2-half-pitch width, because the average amount of line and space will end up being the same no matter where the pixel happens to "land" in relation to the lines due to alignment inconsistencies. More generally the pixel size may be an integral multiple of the pattern pitch, or period of a periodic pattern.

If the pixel size is >1.5 pitch or 3-half-pitch, the response in GL may break down because no matter how much the current level pattern moves, the amount of bright and dark region remains the same and thus no GL difference can be detected. This is illustrated by the squares A and B in FIGS. 8B and 8C respectively. Alternatively, the behavior may become more difficult to interpret, as a reference column might have large variation of bright vs dark pixels as indicated where square C is brighter than square A in FIG. 8B and square D in FIG. 8C is brighter than square C in FIG. 8C.

If the pixel is too small, interpretation also becomes difficult because there may be no change in pixel GL level in response to a pattern or device shift.

With a pixel size exactly 1-pitch in the case where there is OVL shift, one pixel will have the maximum change to dark, while an adjacent pixel will have maximum change to bright.

Figure 14A:
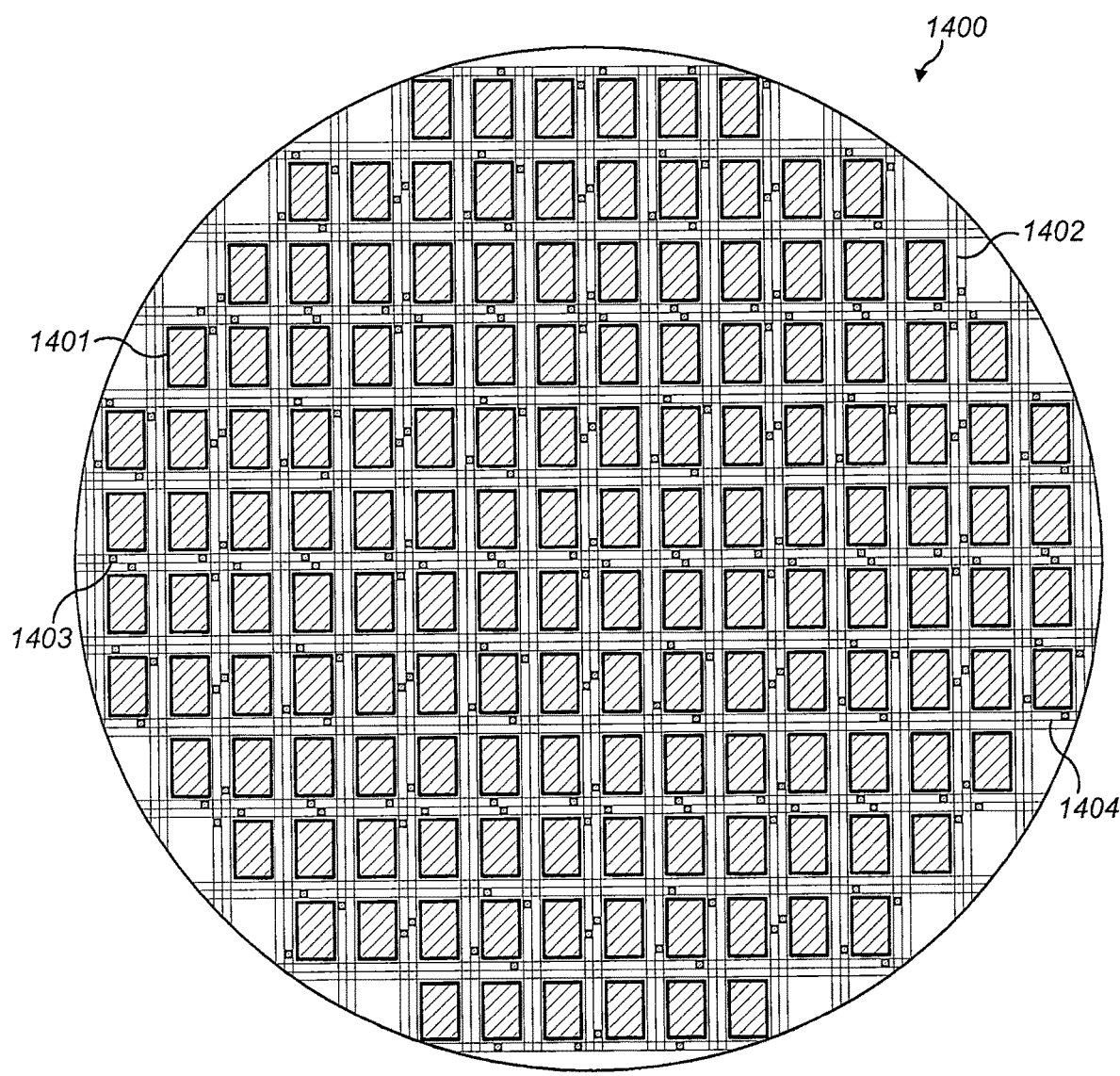
FIGS. 14A and 14B are schematic diagrams showing the placement of metrology targets according to some embodiments of the invention.
Figure 14B:
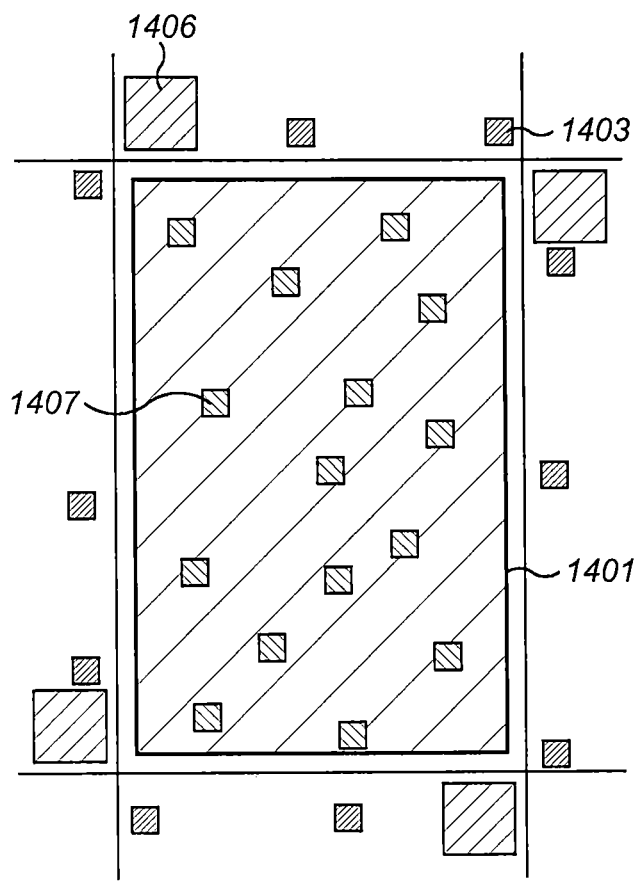

Metrology targets according to some embodiments of the invention, for example as described with reference to FIGS. 7 to 9, may be printed in the scribe line area similarly to known metrology targets. However, they may be printed within a die area on a semiconductor wafer since they are smaller than currently used targets. FIGS. 14A and 14B illustrate possible positions of targets on a wafer according to some embodiments of the invention. FIG. 14A shows a wafer 1400 including rows of dies, one indicated as 1401, separated by scribe lines, one indicated as 1402. The wafer includes targets in the region of the scribe lines, two indicated as 1403 and 1404. These targets may be of a size comparable to individual devices within dies 1401 and may be of the kind shown in FIGS. 7-10. FIG. 14B shows a possible arrangement of targets according to some embodiments of the invention with respect to a single die. These include targets 1403 in the region of the scribe line, larger targets 1406 also in the region of the scribe line, for example as known in the art, and targets 1407 within the die, for example interspersed at locations between devices (not shown). Targets 1406 may be resolvable by the inspection tool whereas targets 1403 and 1407 may not.

Figure 9:
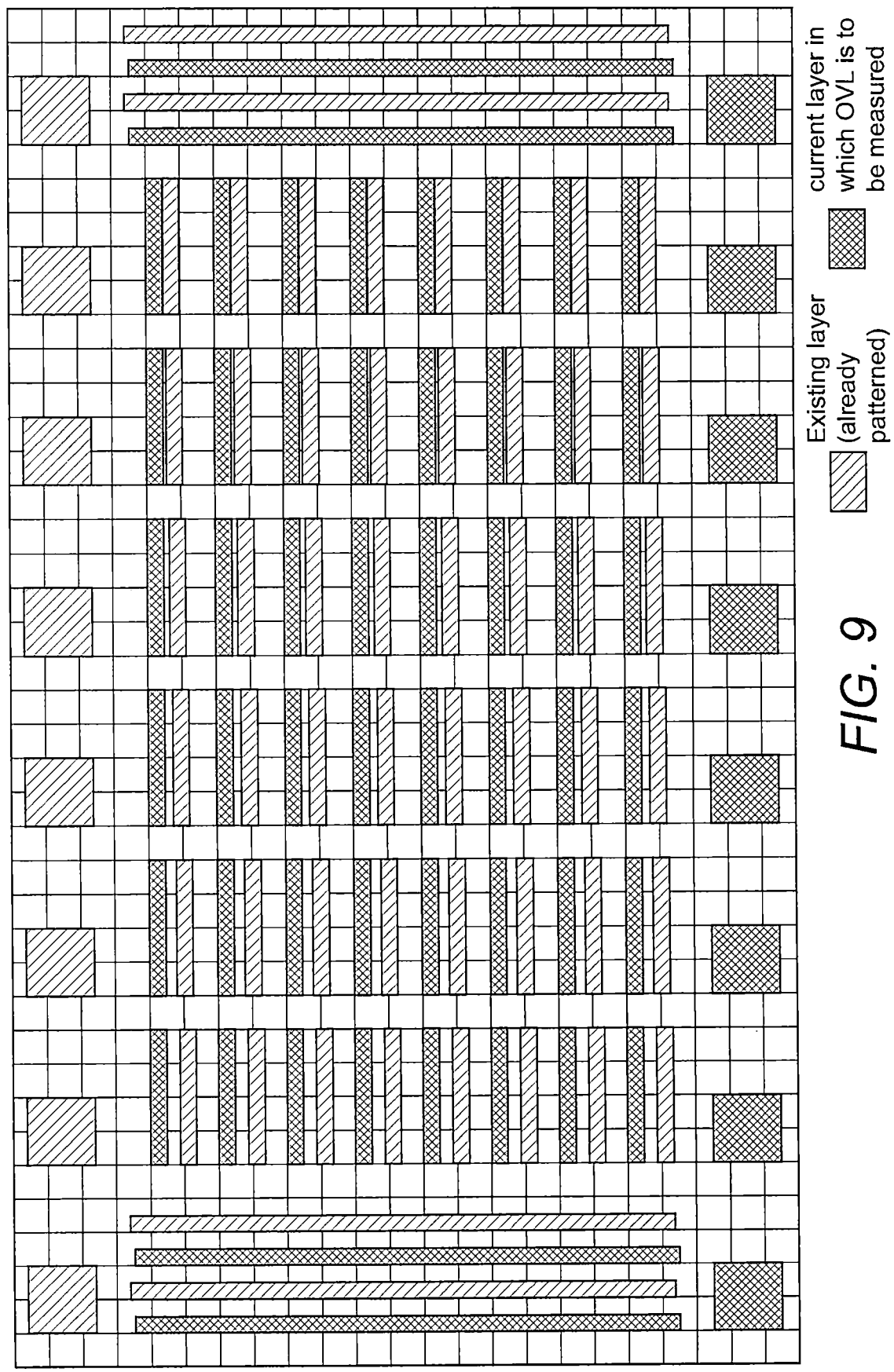
FIG. 9 is a schematic diagram of a metrology target corresponding to FIG. 7 in which the target is subject to OVL according to some embodiments of the invention.

FIG. 9 is a schematic diagram of a metrology target corresponding to FIG. 7 in which the target is subject to OVL. The OVL is assumed to be in the direction of the vertical lines as shown. Here it can be seen that the lines in columns 702-707 in one of the layers are all shifted upwardly by the same amount as compared to the corresponding lines in FIG. 7. The OVL in columns 701 and 708 is only apparent from the ends of the vertical lines which are offset with respect to each other. Therefore, the GL exhibited in columns 701 and 708, apart from the pixels at the ends of the lines, is not affected by the OVL.

Target 700 may be used to calibrate GL difference to OVL for use in determining OVL during a manufacturing process according to some embodiments of the invention. The deliberate offset between columns will be present and will manifest itself as a GL difference regardless of any unintentional OVL that may be present. The same effect may be achieved in principle by deliberately offsetting a device with respect to another device in a manufactured article.

Figure 11:
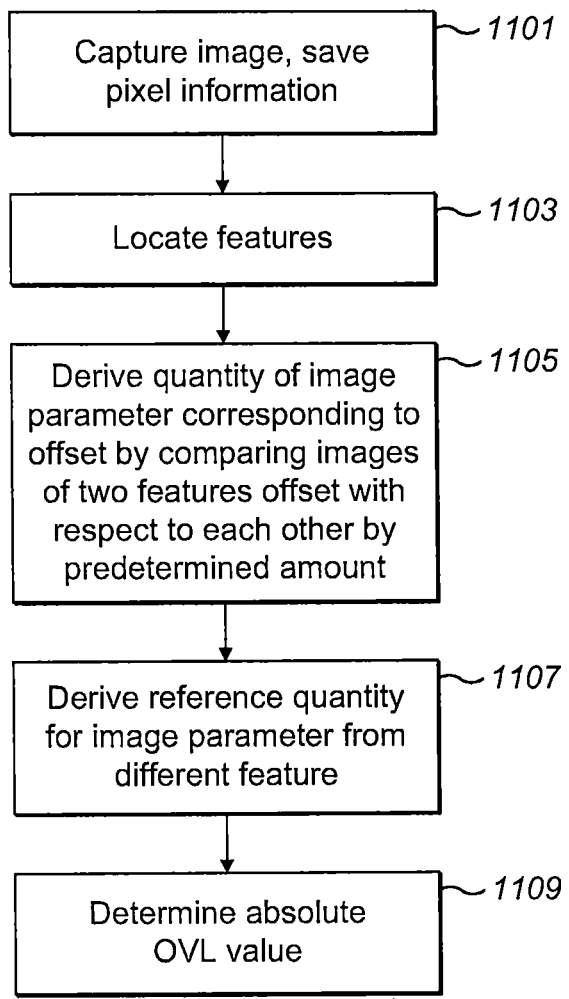
FIG. 11 is a flowchart illustrating a method of calibrating GL to OVL according to some embodiments of the invention.

A suitable method for the calibration using a target as described herein is illustrated with reference to FIG. 11, for one dimension only. The method may be repeated to determine OVL in an orthogonal direction. The method may comprise deliberately causing OVL of a predetermined amount in a feature in an article at a predetermined manufacturing stage with respect to another similar feature, exemplified by the OVL of adjacent columns with respect to each other described with reference to FIG. 9. The flowchart of FIG. 11 assumes that this offsetting has already taken place.

An image of a whole target region may be captured in one "swath" or scan and all pixel information may be saved to memory as indicated by operation 1101. The pixel information may be analyzed by a suitable algorithm to accurately determine the location of the target columns in the image, similar to those used to identify cells for current metrology targets. The image may then be split into separate columns 701-708, or cells or sub-cells, as indicated at operation 1103. In other embodiments of the invention images of features that are deliberately offset with respect to each other may captured separately.

At operation 1105, a quantity of an image parameter corresponding to offset may be derived by comparing images of two features that are offset with respect to each other, such as two adjacent columns in target 700 as described above. This may be used in the compilation of calibration data for converting image parameter quantity, such as GL difference to OVL. Consider for example columns 702 and 703 between which there is an intentional OVL of +1 nm. A GL may be determined for each of columns 702 and 703 and the difference between GLs may be stored in a calibration data set as the GL difference corresponding to the offset between columns, e.g. +1 nm OVL. As noted in connection with FIGS. 2A and 2B, the GL difference between columns may be determined in various ways, including but not limited to determining GL difference between corresponding pixels and then determining an average over all pixels. The GL difference determination may be repeated for each pair of adjacent columns to determine an average GL difference corresponding to the intentional, or known, OVL. The relationship between GL difference and OVL may be assumed to be linear. Therefore, the GL difference between features with known OVL may be used to determine unknown relative OVL between one similar feature and another.

The determination of relative OVL, for example at different stages in a manufacturing process, may be useful in reducing NZO as described with reference to FIG. 1. Nevertheless, some embodiments of the invention may be used to determine an absolute value for OVL. This may be achieved for example through the use of a feature that is insensitive to OVL in the direction being measured. In the particular case of the target of FIGS. 7 to 9 this may be a feature, e.g. sub-cell or column, designed to exhibit the same GL as another feature that is sensitive to OVL. Thus optional operation 1107 in FIG. 11 comprises deriving a reference quantity from a different feature, such as, in target 700, a feature that is not susceptible to a change on GL from OVL in the direction of measurement, and may also exhibit the same GL under conditions of no OVL.

Columns 701 and 708 of target 700, being largely immune to OVL in their longitudinal direction, may be used to determine a reference GL which may then be subtracted from GL measurements obtained from other columns, for example to reduce noise. Columns 701 and 708 may therefore be referred to as reference columns. For example, a GL may be obtained from corresponding regions of parts of reference columns, e.g. excluding the column ends, and divided by the number of reference columns to obtain a reference GL, $GL_{ref}$. The reference GL, $GL_{ref}$ may be subtracted from the GL determined for each column before the column to column difference value is determined.

Knowing the correlation between GL difference and OVL from the column to column subtraction described in the foregoing, an absolute value of OVL may then be determined from the GL difference, as indicated by operation 1109, between a reference column, e.g. column 701 or 708, and a different column designed to exhibit the same GL under conditions of no intentional OVL, e.g. column 702.

Figure 12:
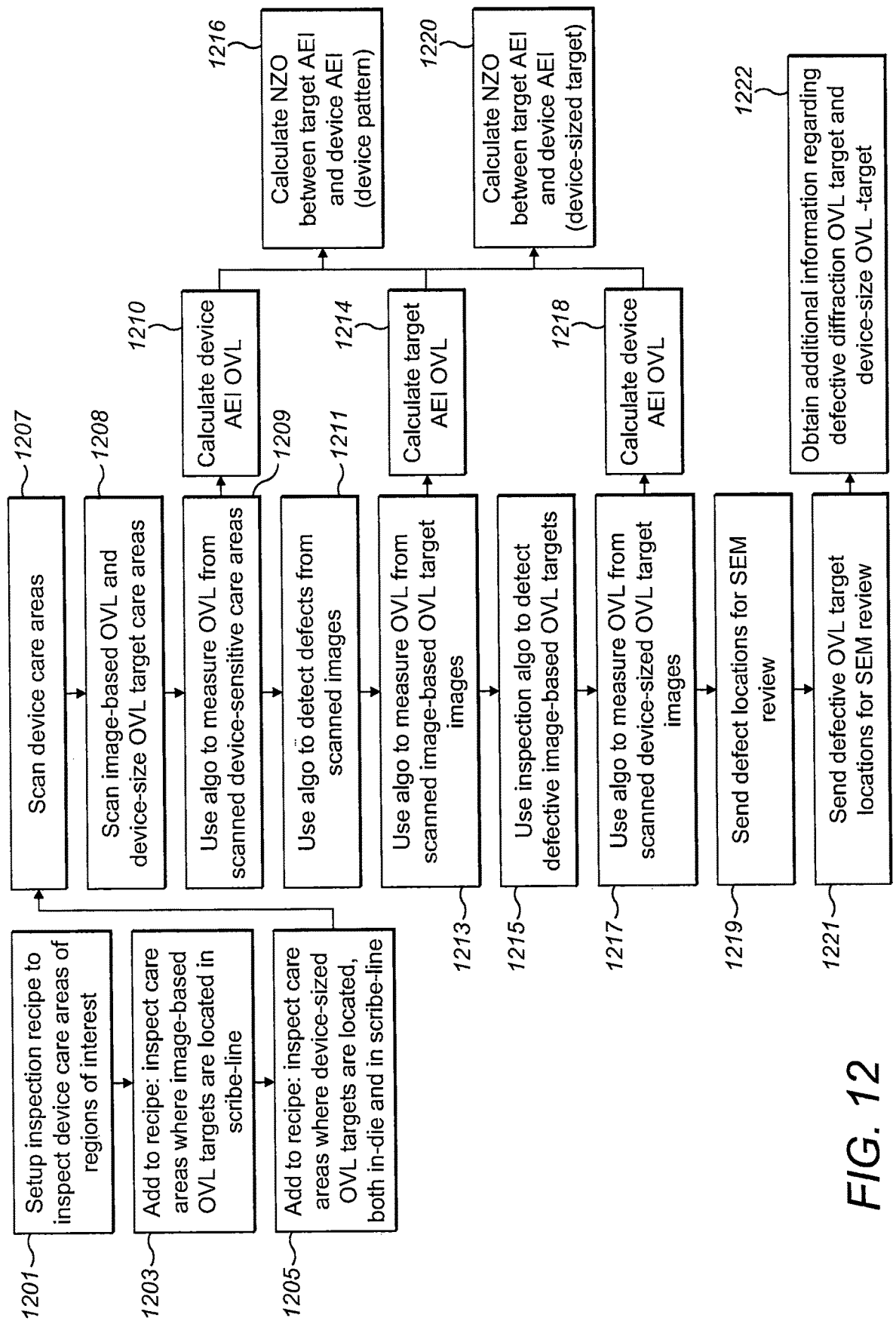
FIG. 12 is a flowchart of a manufacturing processes according to some embodiments of the invention.

FIG. 12 is a flowchart showing how the methods and systems described in the foregoing may be incorporated into a manufacturing process. The method of FIG. 12 may be carried out in an inspection system. In some but not all embodiments of the invention, the operations of FIG. 12 may be performed after an OVL tool has been used to monitor OVL during the manufacture of a wafer, for example using known metrology targets. The method of FIG. 12 may be performed at various stages during manufacture as described elsewhere herein. In particular, different operations forming part of the method of FIG. 12 may be performed at different stages of a manufacturing process. The method may begin with the setting up of an inspection recipe, at operation 1201, defining care areas of regions of interest of a wafer to be inspected, as is known in the art. These "care areas" may be for example areas which are known from experience to be susceptible to error, for example as a result of machine learning. They may be particular devices or parts of devices, also referred to as device patterns, and therefore for the purpose of explanation they are referred to as "device" care areas. It should be noted that these care areas may finally be part of the working circuitry of the device or die. Care areas or device patterns may repeat in many places in a die because they may be typical structures used to build devices. However, the recipe defined at operation 1201 may include any area on a wafer. Metrology targets of the kind currently used in the art may be excluded. The method may proceed to operation 1203 where the locations of OVL targets as known in the art, are added to the inspection recipe as additional care areas. These may include targets designed to generate diffraction patterns and so-called image based targets. Typically, different illumination techniques are used to obtain information from diffraction-based and image-based targets. Both kinds of target may be placed at various places on a wafer, for example in the region of a scribe line indicating where a completed wafer is to be cut. OVL measured using a diffraction-based target is sometimes referred to as optical Image-based OVL targets in the region of a scribe line are referred to in FIG. 12 by way of example. The method may then proceed to operation 1205 where the locations of OVL targets, designed specifically for use in methods according to some embodiments of the invention for example as described herein, are added to the inspection recipe. Such targets may for example have dimensions similar to those of devices and are therefore referred to in FIG. 12 as device-size by way of example. These too may be at various places in the wafer. Since they may be smaller than currently used targets they may be located "in die" for example within an integrated circuit formed on a wafer, and not confined to regions outside dies such as scribe lines, thus operation 1205 refers to "in die and in scribe line". The placement of targets according to some embodiments of the invention is described in more detail with reference to FIG. 14. It will be appreciated that any of operations 1201, 1203 and 1205 may be combined.

The process of scanning by the inspection tool may then commence. At operation 1207 the care areas identified in the inspection recipe may be scanned.

At operation 1208 the metrology, e.g. OVL targets may be scanned. As noted elsewhere herein these targets would not usually be inspected as part of a device inspection process. According to some embodiments of the invention operation 1208 may be limited to the scanning of OVL targets of the kind already used in OVL measurement, for example image-based OVL targets. According to other embodiments of the invention this may include scanning of new OVL targets as described herein, for example device-size OVL targets. It will be appreciated that the scanning of OVL or other metrology targets may be integrated with the scanning of defect or care areas in operation 1207 and need not be a separate scanning operation. The results of the scanning may then be analyzed, for example by means of algorithms forming part of program instructions 518 operated by a processor within computing system 514.

At operation 1209, an algorithm may be used to measure overlay from images of device care areas obtained from the scanning operation 1207, for example device patterns or parts of patterns in layers deposited in a manufacturing process. This may be achieved for example using a method as described with reference to FIG. 6. As noted elsewhere herein the algorithm may use machine learning, for example to generate reference images or reference quantities from which to calculate instant OVL or other errors.

Assuming operation 1207 was performed after etching, the output of operation 1208 may be a device AEI OVL as described with reference to FIG. 1. Alternatively, the output of operation 1208 may be used to calculate a device AEI OVL at operation 1210.

At operation 1211 defects from scanned images may be detected, for example in a manner known in the art, for example using an algorithm. This may be useful to determine other faults in the manufacturing process.

At operation 1213 OVL may be measured from the results of scanning known OVL targets using methods according to some embodiments of this invention, for example a method as described with reference to FIG. 6, for example using an algorithm. Thus according to some embodiments of this invention, already available metrology targets may be analyzed in ways not currently used in the art.

Again supposing that operation 1207 was performed on a target after etching, then at operation 1214 a target AEI OVL, as described in connection with FIG. 1, may be calculated similarly to the calculation of device AEI at operation 1210. Then at operation 1216 a value for NZO between target AEI and device AEI may be calculated from the results of operations 1210 and 1214.

At operation 1215, an inspection algorithm may be used to detect defective diffraction OVL targets or other kinds of targets as known in the art. This information may be fed back for use in the setting up of inspection recipes and/or for use as part of an inspection scan, for example at operation 1208. Defective targets may include targets which have been damaged in the manufacturing process either fully or partially. The confidence in the correctness of an OVL or other error measurement can be determined based in part on knowledge of defective targets.

At operation 1217 OVL may be measured from the scanning of targets designed for use by the inspection tool, such as those described with reference to FIGS. 7 to 9, for example using a method as described with reference to FIG. 11, for example using an algorithm. Again, supposing that operation 1209 was performed on a novel or non-standard target after etching. Since the target may have a size of a similar order to a device, at operation 1218 a "device" AEI OVL, as described in connection with FIG. 1, may be calculated. The determination of OVL using a dedicated target for use by an inspection tool, for example as described with reference to FIG. 7, has the advantage that prior knowledge of OVL sensitive device areas is not needed, and this may reduce the need for machine learning of where sensitive areas lie.

Again, targets which indicate a defect or error may be detected at operation 1219 in a manner similar to operation 1215.

At operation 1220 a value for NZO between target AEI and "device" AEI may be calculated from the results of operations 1214 and 1218.

The OVL value calculated or measured at operation 1217 may be used to predict where OVL related defects may occur. The prediction may be used in sampling of areas for further review, for example by SEM. The prediction may be part of a machine learning process for example. At operations 1219 and 1221 the locations of defects in devices or OVL targets may be reported for more detailed inspection, for example by a SEM. At operation 1222 additional information may be obtained regarding defective targets of all kinds scanned, such as part of a target damaged by a process step or improper wafer handling.

It will be appreciated from the foregoing that some embodiments of the invention may be used to identify OVL errors of the kind that were hitherto only identifiable using SEM inspection. Some embodiments of the invention may be used to progressively reduce the need for SEM as experience with use of the invention increases, for example through the use of machine learning.

The possibility to obtain OVL information using a device inspection tool instead of SEM opens up the possibility of investigating causes of OVL in ways that are prohibitively expensive using SEM. For example, deliberate introduction of OVL in device manufacture, in addition to or as an alternative to target offset, may be used to identify device features that are particularly sensitive to OVL errors, identify areas on an article or device that require particular care, or stages in manufacturing processes that are particularly vulnerable to error. It should be noted that the device-sized metrology targets or patterns described herein may be placed almost anywhere on a semiconductor wafer or die.

Figure 13:
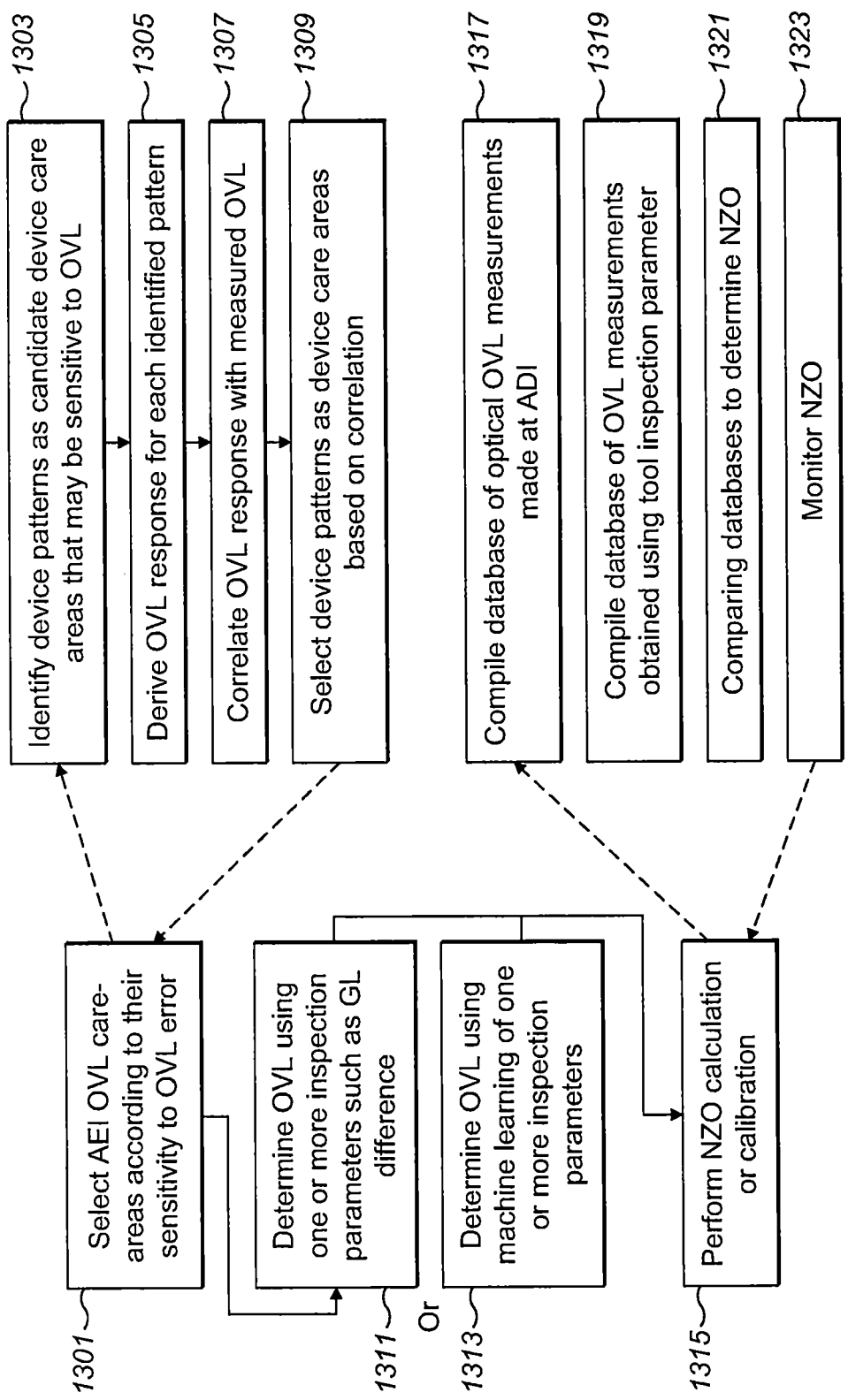
FIG. 13 is a flowchart of a method of determining a device inspection recipe for use by device inspection tools according to some embodiments of the invention.

Embodiments of the invention are not limited to determination of OVL by reference to image parameters, and may be based on correlation of any device inspection tool parameter with OVL measured by SEM, by using known targets or measured in any other way. Some embodiments of the invention provide methods of determining device inspection recipes for use by device inspection tools. Some such methods are described with reference to FIG. 13 and may include selecting care areas, for example AEI OVL care areas, according to their sensitivity to OVL error as indicated by operation 1301.

"Care area" is a term used in the art to denote an area in a wafer pattern where particular care in manufacturing is required, for example defining a device that is particularly susceptible to manufacturing tolerances. Some such areas are more sensitive than others to OVL. The areas selected in the flow shown in FIG. 13 may be the device care areas included in the setup inspection recipe in operation 1201.

The selection in operation 1301 may comprise a number of operations including operations 1303-1309. Operation 1303 comprises identifying device patterns as candidate device care areas that may be sensitive to OVL.

The identification of candidate device patterns may use graphic database system "GDS" data. Instructions for forming layers of a semiconductor wafer, each comprising device patterns, may be in the form of a GDS. A method of selecting device areas to be inspected in operation 1201 may comprise searching or analyzing the GDS data for at least two layers, for example using known algorithms, to identify device areas or patterns that are sensitive to OVL. Examples of such areas are shown in FIG. 2. Alternatively, other methods may be used to identify candidate device patterns.

For each identified pattern an OVL response may be derived, as indicated by operation 1305. This may comprise determining different values of a device inspection parameter, such as gray level or any other variable in an inspection tool, for device patterns that have been subject to different levels of OVL. The different levels of OVL may have been applied deliberately as part of a candidate selection process or may be unintentional and used for the purpose of learning which patterns are susceptible to OVL. Examples of parameters include but are not limited to Intensity (GL difference), polarity, Multi-Die Adaptive Threshold "MDAT"-GL, other energy parameters, contrast, and noise level.

The OVL responses may then be correlated with OVL as indicated by operation 1307. The OVL may be measured in any way, for example using SEM, using known metrology targets or using any of the metrology targets described herein. Known metrology targets may include scribe line image-based OVL targets or diffraction based OVL targets as known in the art. Other metrology targets as described herein may include off-die or in-die targets for example as shown in FIGS. 7 and 10.

Some or all of the device patterns may then be selected as device care areas at operation 1309 based on the correlation. For example, a predetermined number or predetermined fraction of patterns may be selected according to degree of correlation, or only those with correlation above a predetermined threshold may be selected.

After one or more device care areas have been selected, they may be used to determine an OVL measurement. The OVL measurement may be determined in several ways. Two possible non-limiting examples are shown as operations 1311 and 1313. Operation 1311 may comprise measuring an inspection parameter such as GL. The parameter measurement may be converted to an OVL measurement based on a previously determined correlation between the inspection parameter and measured OVL, for example as described elsewhere herein. Alternatively, the OVL measurement may be determined as indicated by operation 1313 using machine learning of one or more inspection parameters, for example GL, for example fitting a measured value to a model of the variation of the parameter with OVL. Either of operations 1311 and 1313 may be performed using an inspection tool such as a broad band plasma tool described herein.

The measured OVL may then be used for NZO calculation or calibration at operation 1315. NZO calculation or calibration according to some embodiments of the invention may be carried out in an analogous manner to methods known in the art where OVL is measured with the use of SEM. According to other embodiments of the invention, some or all of the operations previously performed using SEM may be performed by an inspection tool thereby leading to reduction in cost. A possible flow for NZO calibration may comprise operations 1315 to 1323.

At operation 1317 a database of optical OVL measurements at ADI, obtained for example using a diffraction based target, may be compiled. Typically, in order to determine NZO OVL measurements from hundreds of points, or targets, may be obtained and recorded in the database. The database may comprise raw data. Alternatively, the data may be fitted to a model as is known in the art. The model may use various parameters and variables. For example, the model may be used to predict OVL in a device in a particular region of a wafer, at a particular layer and for many other variables. Thus instead of or in addition to the raw data, the database compiled at operation 1317 may comprise a set of terms, e.g., parameters or variables, and coefficients.

At operation 1319 a database of OVL measurements obtained using an inspection tool parameter, for example as described with reference to operations 1311 or 1313 may be compiled. As with operation 1317, the database may comprise raw data and/or it may comprise data fitted to a model using various parameters and variables. The basic model may be the same model as a model used in operation 1317, for example the same variables such as but not limited to location on wafer, layer, and others may be used in both models, but the coefficients may be different. The model may be of any kind known in the art including linear, second order, third order and so on. Operation 1317 may be performed at AEI, for example for the purpose of comparing target AEI and device AEI. Alternatively operation 1317 may be performed at ADI, for example as explained further herein, for the purpose of comparing target ADI with device AEI. Operation 1319 may use measurements obtained using a bright field, e.g. BBP, tool, according to any of the methods described herein, whereas hitherto operations similar to operation 1319 would be performed using SEM.

At operation 1321 the databases compiled at operations 1317 and 1319 may be compared in order to analyze or determine NZO, in any manner known in the art. Such comparison is known in the art for comparison of measurements obtained from SEM measurements but not for comparison of measurements derived from tool inspection parameters. The comparison at operation 1321 may be a model to model comparison, for example an ADI model and an AEI model, and the result may be a model to model (M2M) difference, for example obtained by model to model subtraction. Alternatively, if the databases are in the form of raw data, the comparison may involve calculating a raw to raw "R2R" difference, for example nearest raw ADI OVL measurement to nearest raw AEI OVL measurement, using point to point subtraction and nearest neighbor techniques known in the art. The NZO may be determined from these measurements may be determined in any manner known in the art.

At operation 1323 the NZO may be monitored and corrective action may be taken if necessary. NZO may drift and therefore it is desirable to determine NZO at regular intervals to check that it is within acceptable tolerance limits. Instead of monitoring a measurement of NZO, the M2M or R2R measurements may be monitored at operation 1323 since variations in either of these will indicate a drift in NZO.

Measurements of any of NZO or M2M or R2R may be compared to or fed back to a calibration file, for example provided by a customer for devices, specifying acceptable limits which may for example be different for different parts of a wafer. If NZO or M2M or R2R are within the specification no action will be required, but if they are outside, for example as a result of drift due to process changes, corrective action may be required such as an adjustment in the manufacturing process, or possibly repeated calibration of a target.

Currently used optical OVL targets typically need to be calibrated at regular intervals to determine the OVL corresponding to information obtained from a target. It should be noted here that targets of the kind described with reference to FIGS. 7 to 10 may only need to be calibrated once. Particularly if such targets are formed within devices, or in die regions such as targets 1403 in FIG. 14B, they will be subject to the same process variations as the devices themselves and therefore re-calibration is not necessary. Targets formed in a die area may be more representative of process variations affecting the devices and therefore more suitable as an early indication that a process variation has occurred.

As noted elsewhere herein, embodiments of the invention may be used to reduce or even eliminate the need for inspection of OVL using SEM. Currently, measurements of optical OVL are checked at regular intervals for drift using SEM, for example every few days. The use of SEM is very costly and time consuming. According to some embodiments of the present invention, drift in OVL measurements obtained using optical targets may be checked using an inspection tool instead of a SEM. OVL may be measured as part of a process checking for other defects and does not require separate equipment. Data for measuring OVL may be obtained at the same time as scanning for defects instead of during a separate scan. The use of a target inspection tool to determine OVL may be faster and less costly than using a SEM and this makes it feasible to check for drift more frequently than in current processes.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram or portions thereof.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of error measurement in a semiconductor manufacturing process comprising:
   capturing an image of a feature in an article at a predetermined manufacturing stage using an imaging tool thereby generating a captured image, wherein the image shows variations of an image parameter;
   deriving a quantity of the image parameter from the image; and
   converting the quantity into an overlay error measurement by reference to a quantity for said image parameter derived from a reference image of a feature at said predetermined manufacturing stage.

2. The method of claim 1 wherein a size of the feature is smaller than a resolution of the imaging tool.

3. The method of claim 1 wherein the image is captured using a pixelated image capturing array and the quantity of the image parameter is derived by comparing corresponding pixels in the captured image and the reference image.

4. The method of claim 1 wherein the image parameter is gray level.

5. The method of claim 1, further comprising generating the reference image by averaging multiple images of the same feature at a same stage of manufacture, either on a same one of the article or a plurality of the article.

6. The method of claim 1 wherein the reference image is generated by computer modelling of the semiconductor manufacturing process.

7. The method claim 1 wherein the converting comprises obtaining an error value from calibration data describing a relationship between the quantity of the image parameter and error.

8. The method of claim 7, further comprising compiling calibration data for converting the quantity of the image parameter to an error value by:
   i) offsetting a feature in an article by a predetermined amount at said predetermined manufacturing stage with respect to another similar feature thereby generating an offset feature;
   ii) capturing one or more images of the offset feature and another similar feature at said predetermined manufacturing stage thereby generating one or more captured offset feature images;
   iii) deriving a quantity of said image parameter from said one or more captured offset feature images.

9. The method of claim 1 wherein the feature is part of a metrology target.

10. The method of claim 9 wherein the reference image is derived from a different feature in the metrology target.

11. The method of claim 10 comprising forming the metrology target during the semiconductor manufacturing process, wherein the target comprises at least two different features designed to exhibit the same quantity of said image parameter and wherein said capturing captures an image of one of the two different features and said reference image is derived from a different one of said at least two different features.

12. The method of claim 11 wherein the metrology target comprises at least two of the features offset from each other by a predetermined amount and wherein the method comprises calibrating said image parameter to error by determining a difference in said image parameter between said at least two features.

13. The method of claim 9 wherein the metrology target comprises a pattern of lines and spaces and is sized such that an image pixel size is up to 5 times a width of a target line or space.

14. The method of claim 9 wherein the target comprises a periodic pattern of lines and spaces and the target is sized such that an image pixel size is up to twice the sum of a line and space width.

15. The method of claim 9 wherein the target comprises a periodic pattern of lines and spaces and the target is sized such that an image pixel size in the captured image is an integral multiple of a total of a pattern pitch.

16. The method of claim 1 wherein the feature is an electronic device.

17. A method as claimed in claim 1 wherein the semiconductor manufacturing process includes one or more etching operations and the method is performed as part of a device inspection after the one or more etching operations.

18. A method as claimed in claim 1 wherein the semiconductor manufacturing process includes one or more resist development operations and the method is performed as part of a device inspection after the one or more resist development operations.

19. A semiconductor wafer inspection system comprising a sensor to capture images of features of a wafer and a computing system comprising one or more processors configured to:
capture an image of a feature in an article at a predetermined manufacturing stage, wherein the image shows variations of an image parameter;
derive a quantity of the image parameter from the image; and
convert the quantity into an overlay error measurement by reference to the quantity for said image parameter derived from a reference image of the feature at said predetermined manufacturing stage.

20. A computer readable medium which when implemented in a processor in a semiconductor wafer inspection system causes the processor to:
receive an image of a feature in an article at a predetermined manufacturing stage, wherein the image shows variations of an image parameter;
derive a quantity of the image parameter from the image; and
convert the quantity into an overlay error measurement by reference to a quantity for said image parameter derived from a reference image of a feature at said predetermined manufacturing stage.

* * * * *